Figure 2B:
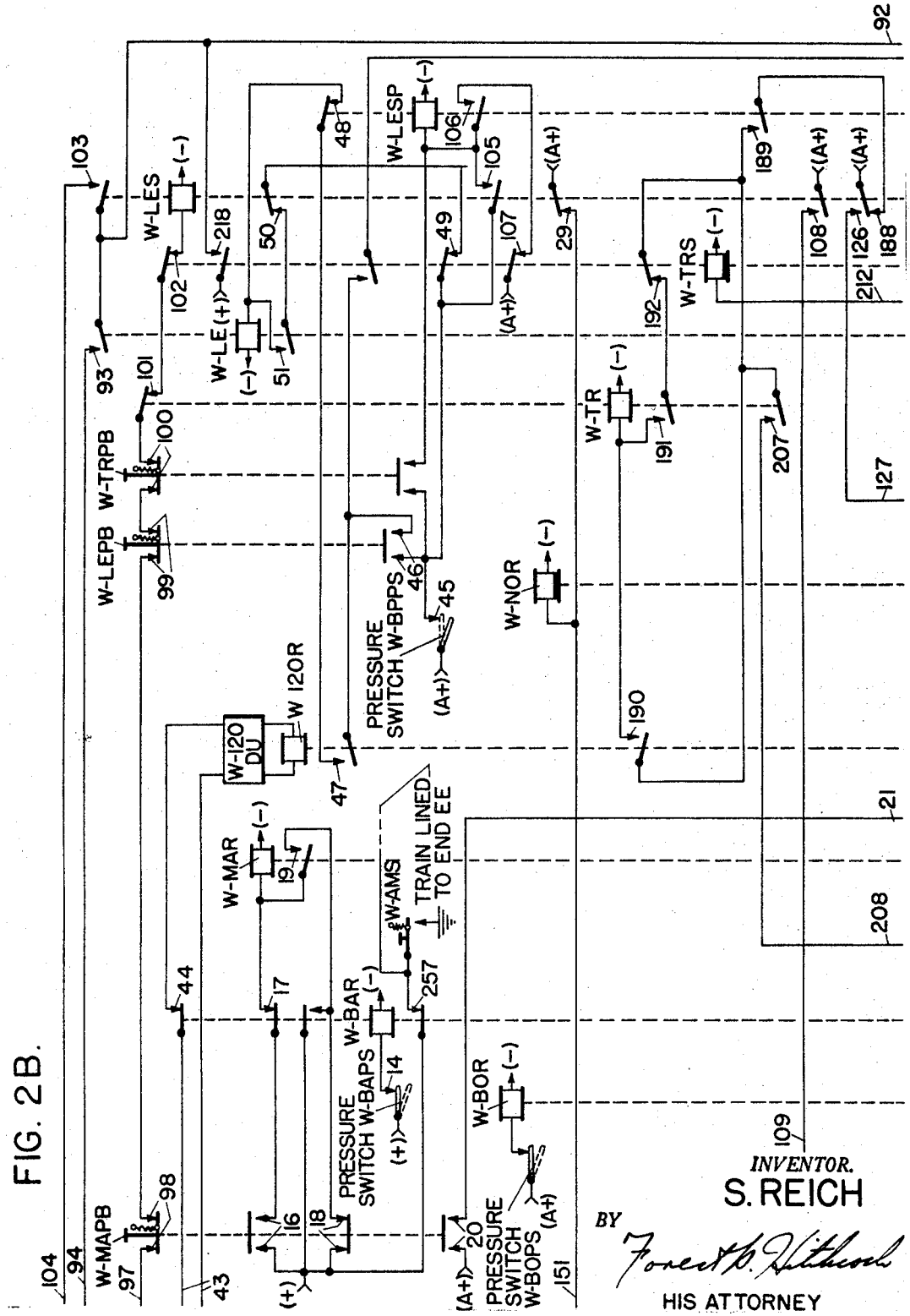

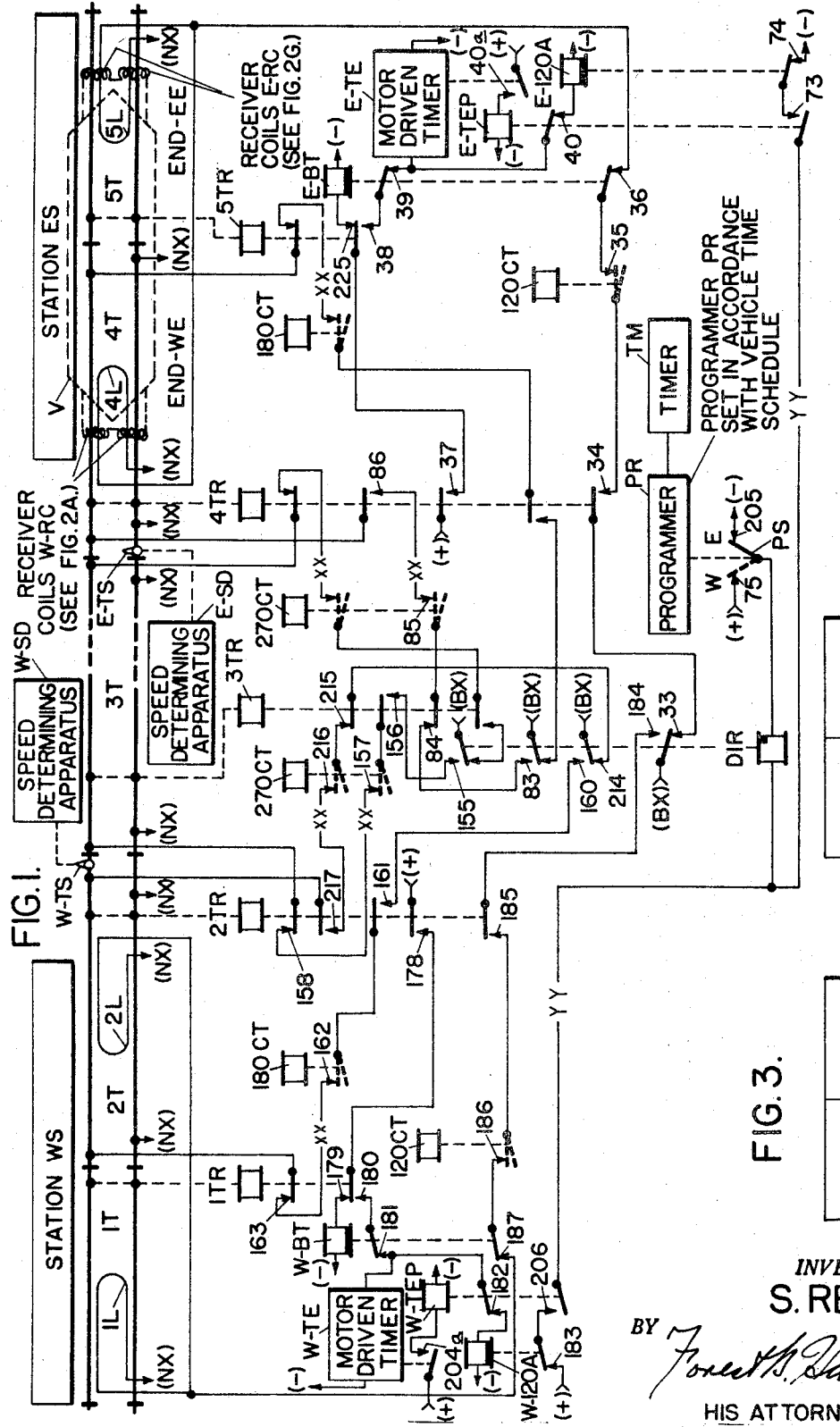

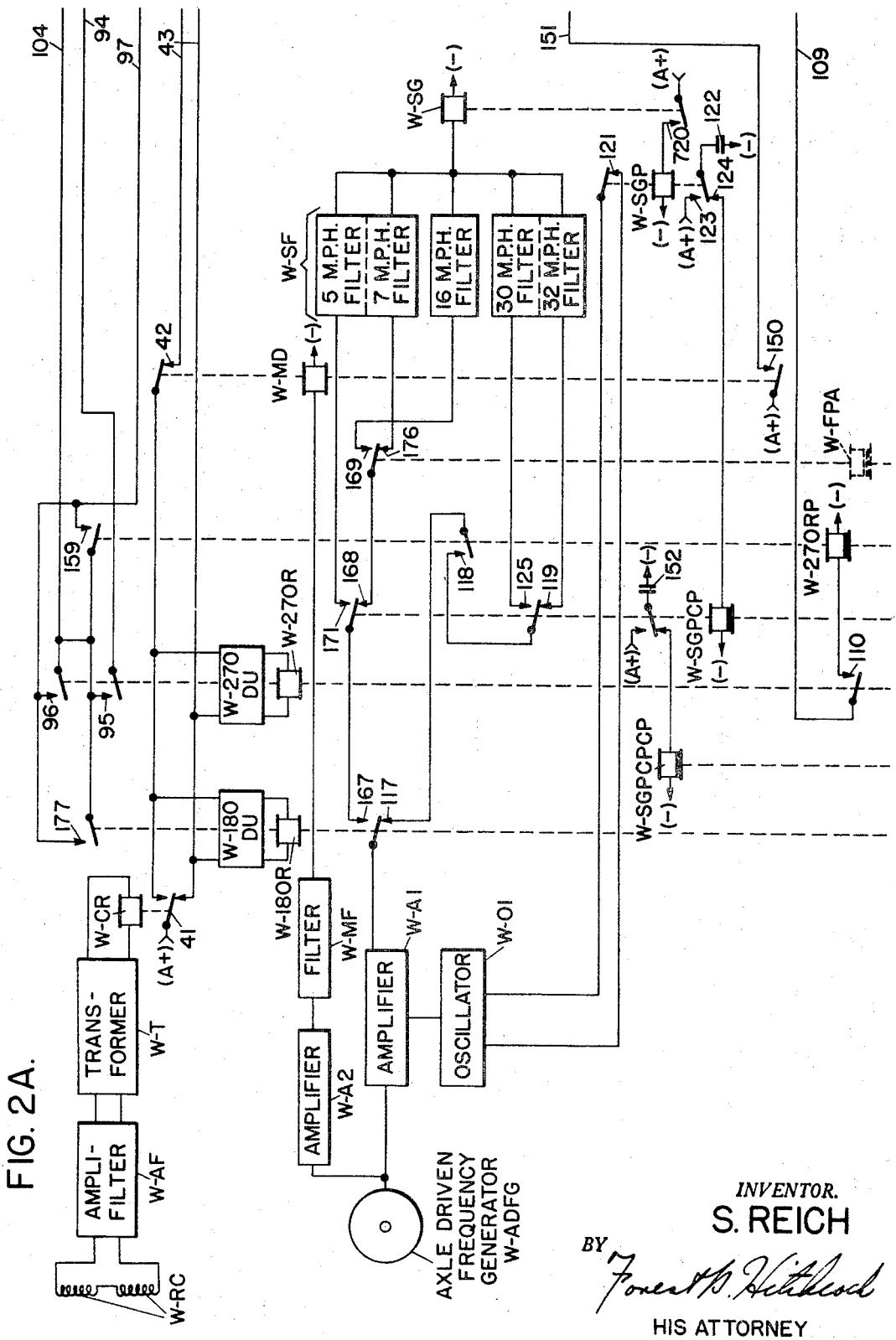

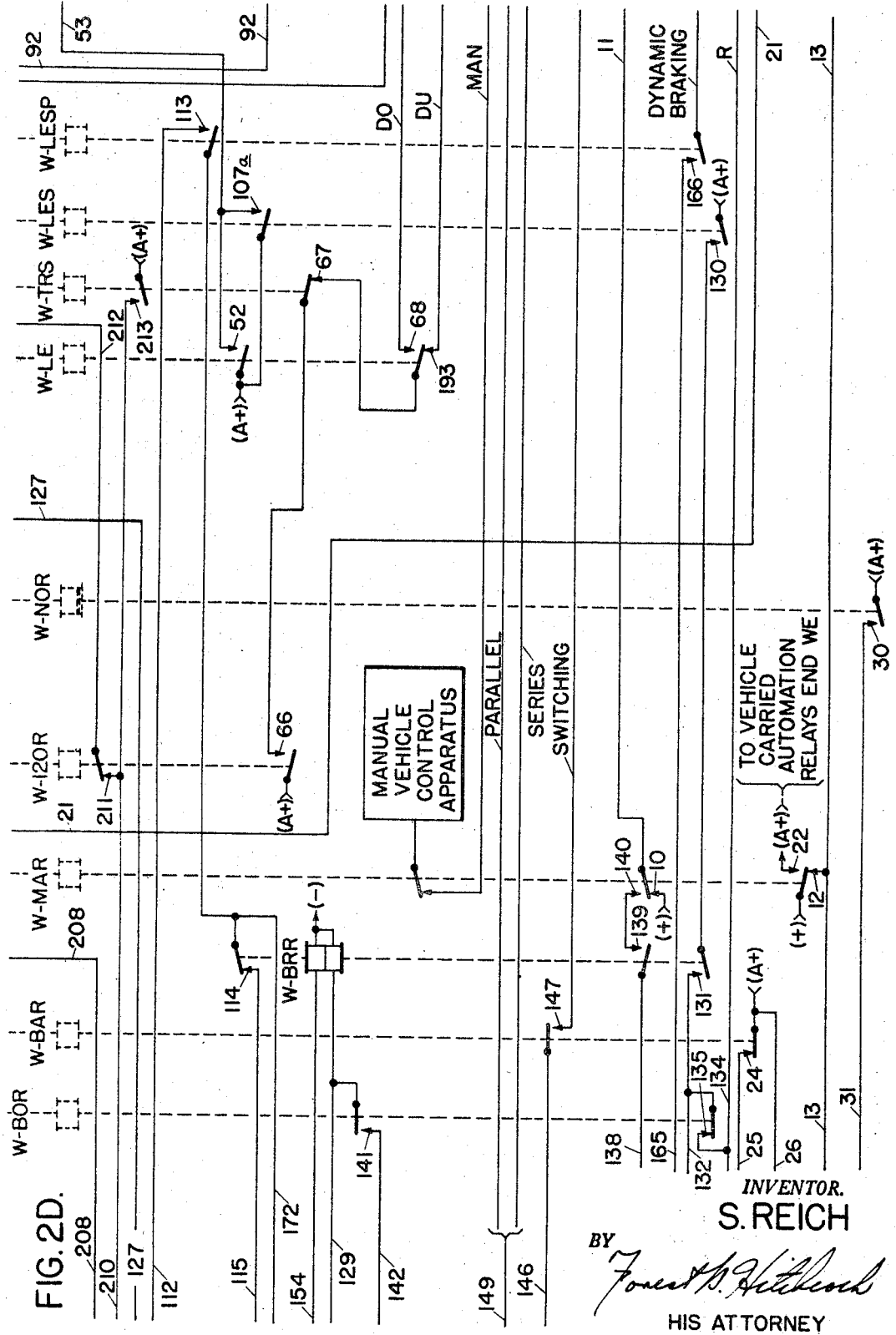

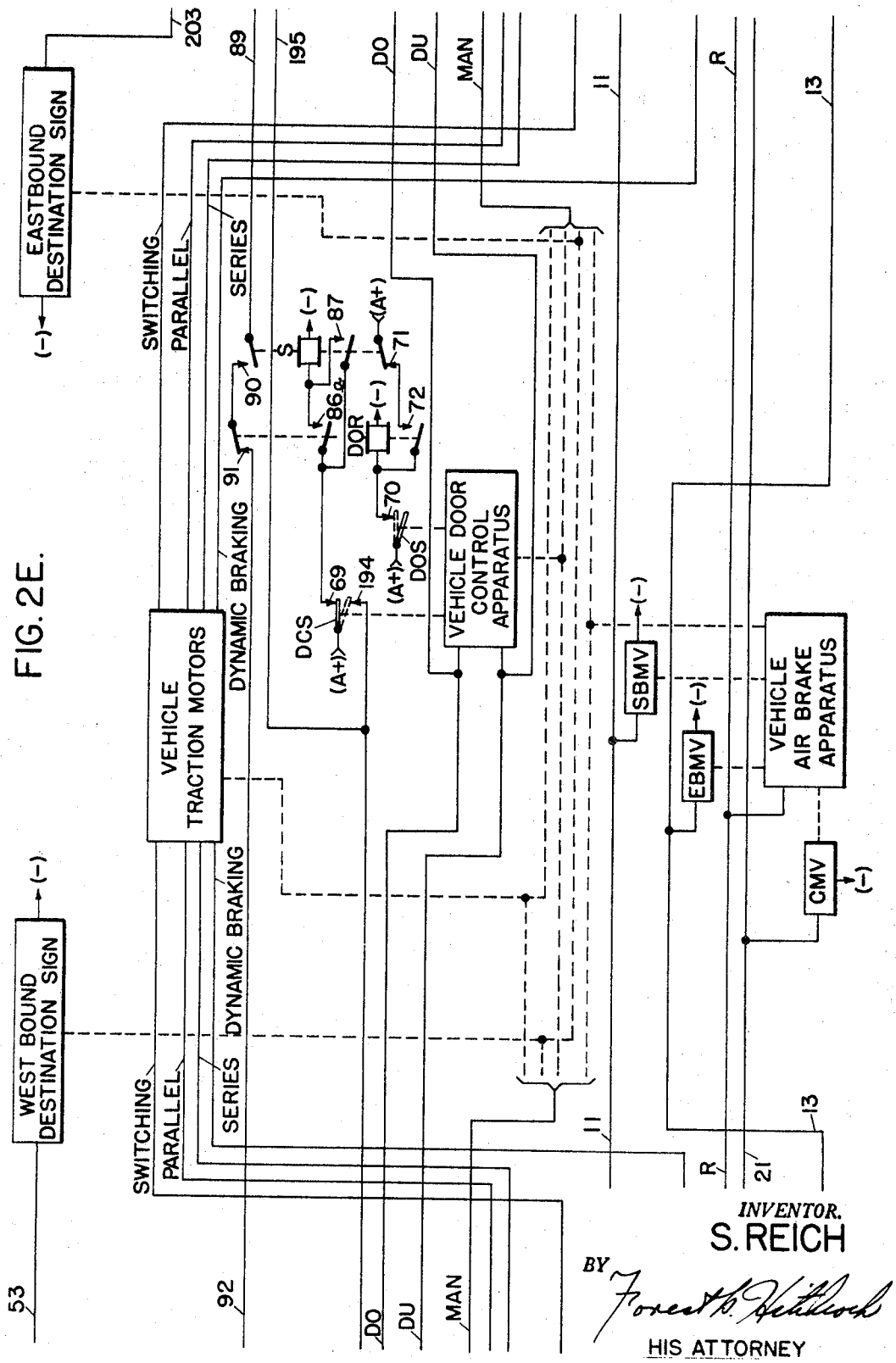

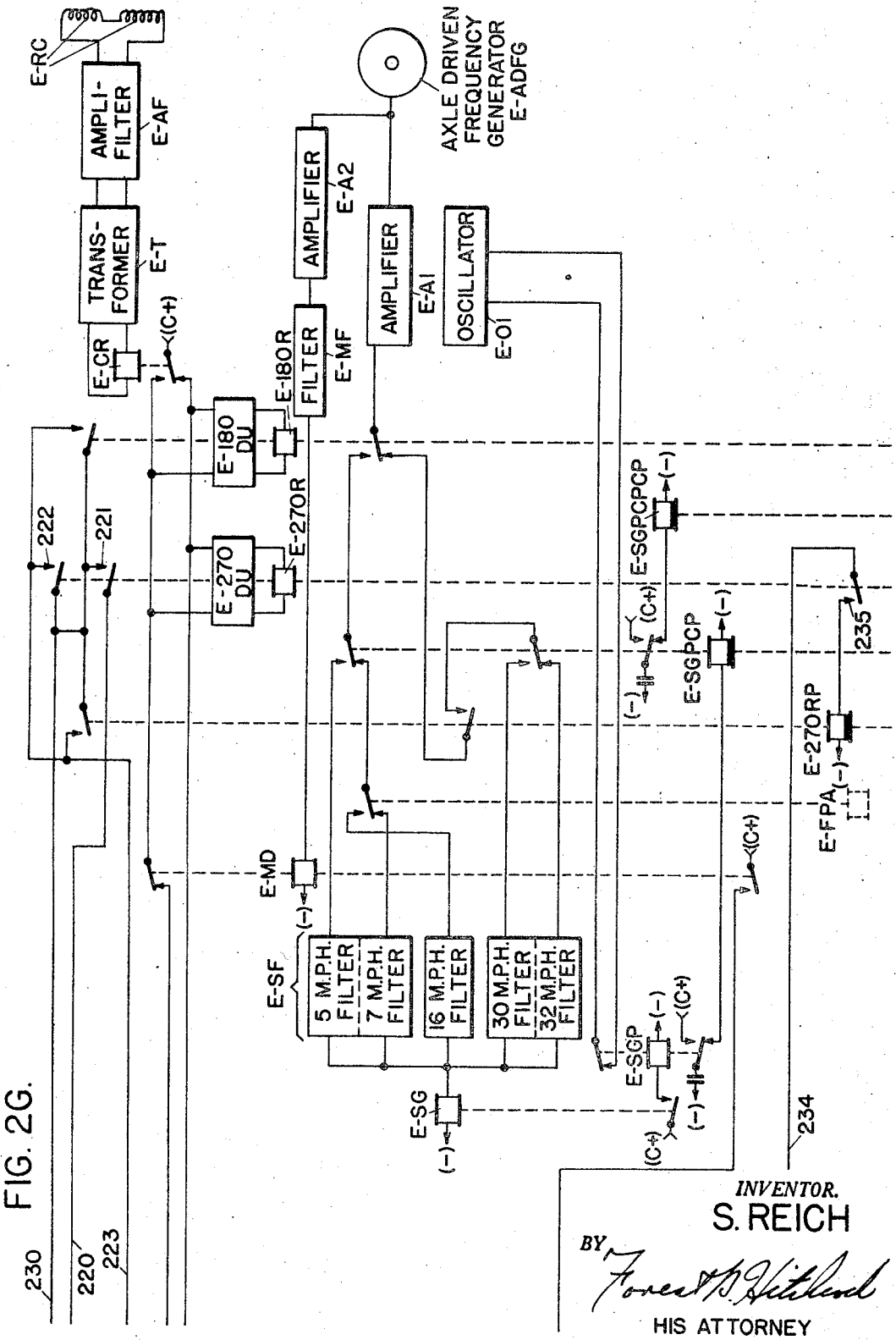

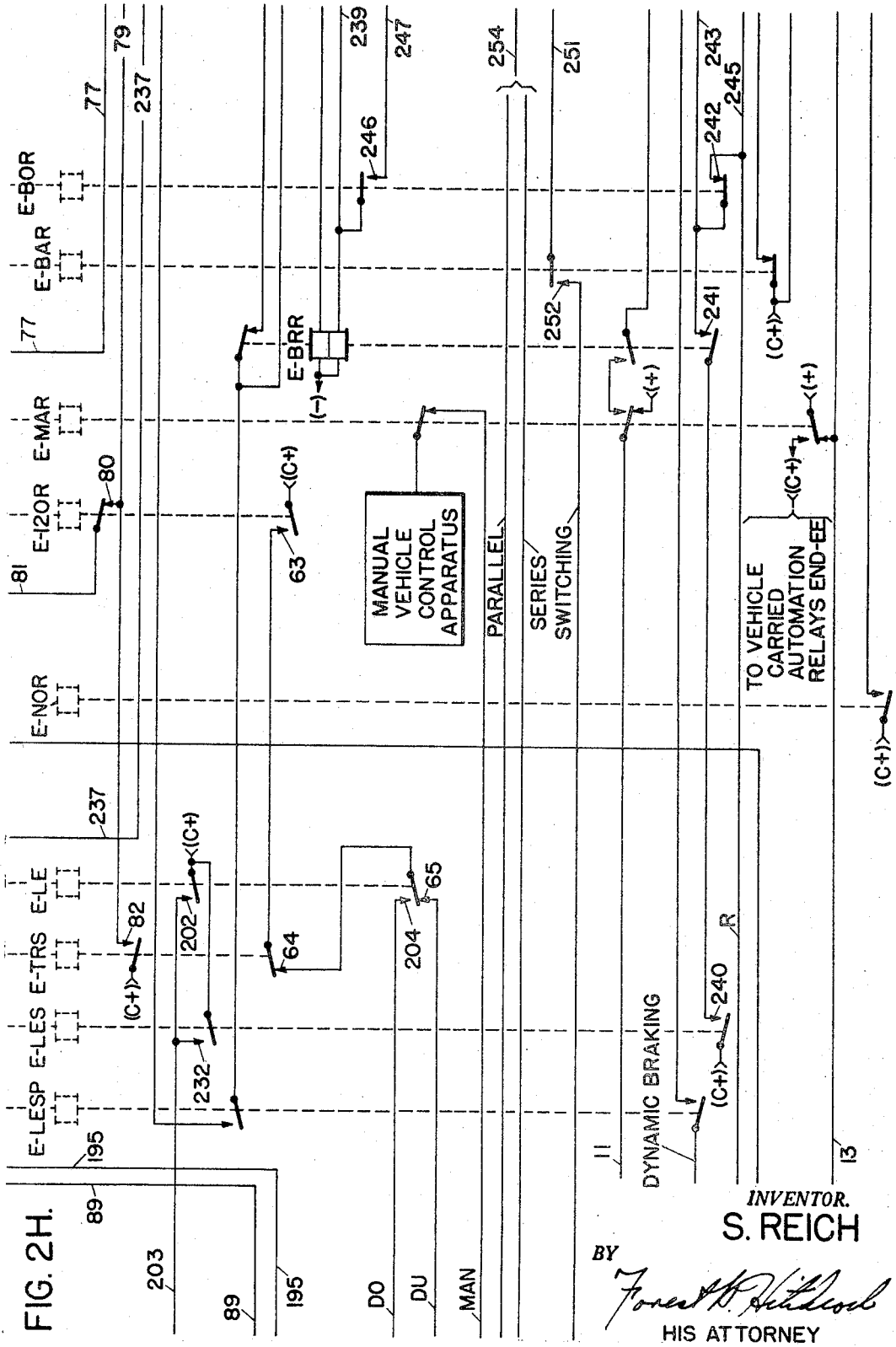

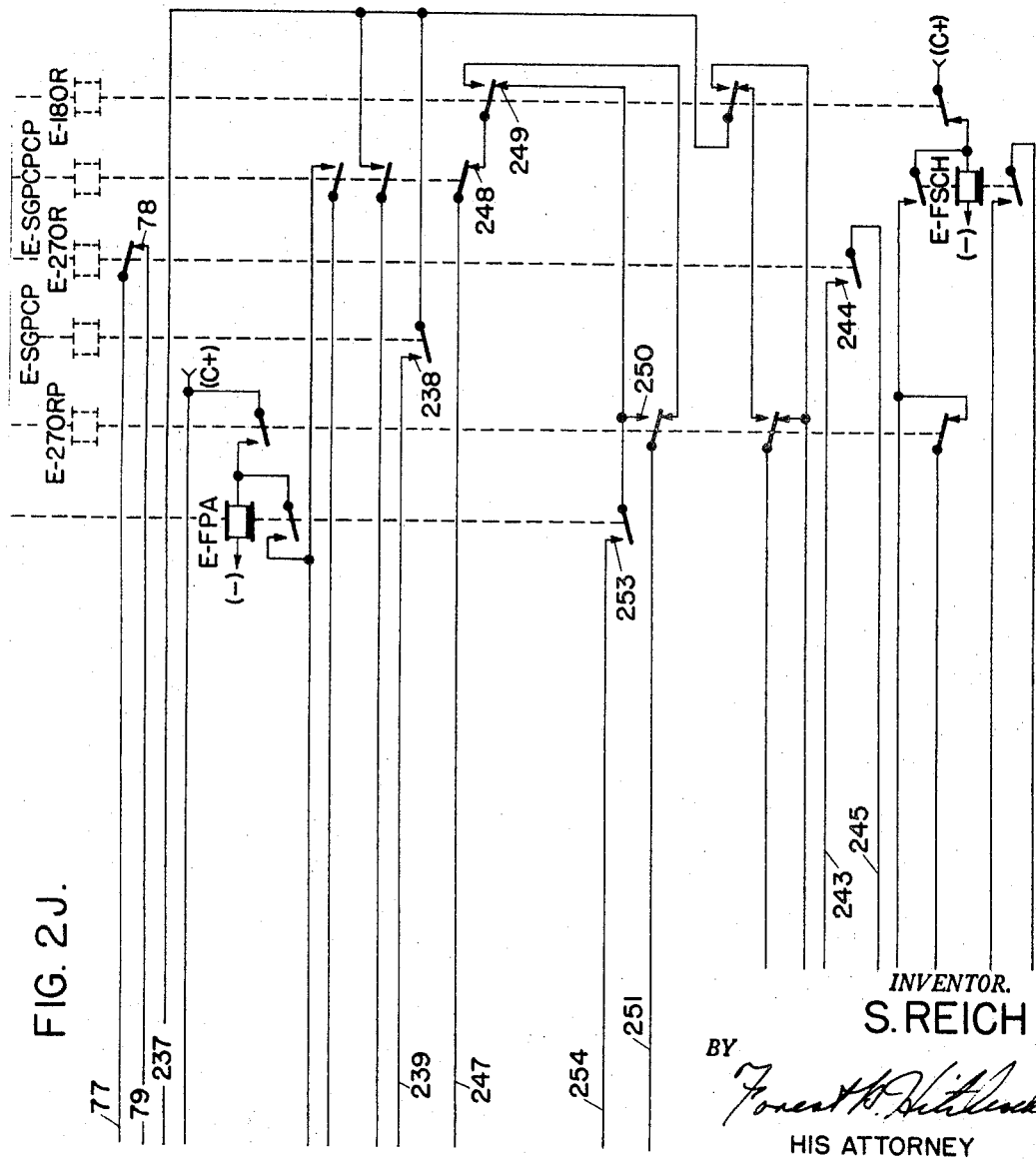

United States Patent Office 3,432,654
Patented Mar. 11, 1969

3,432,654
VEHICLE REMOTE CONTROL SYSTEM
Simon Reich, Rochester, N.Y., assignor to General Signal Corporation, a corporation of New York
Filed June 5, 1961, Ser. No. 114,748
U.S. Cl. 246—187         8 Claims
Int. Cl. B61l 3/00

This invention generally relates to vehicle remote control systems and more particularly pertains to the remote control of an unmanned vehicle in opposite directions over a right-of-way.

In order to remotely control an unmanned vehicle, from the wayside, for operation of the vehicle in opposite directions over a stretch of right-of-way, it is considered necessary to establish the desired direction of travel of the vehicle over the right-of-way, to transmit vehicle control information from the wayside to the vehicle indicative of the desired performance of the vehicle in this desired direction, and to condition the vehicle to respond only to the vehicle control information for the desired direction of vehicle travel so that the vehicle power unit propels the vehicle at the desired running speeds in the desired direction along the stretch of right-of-way.

In order to fully disclose the present invention, a specific railway embodiment is shown and described herein for remotely controlling a shuttle railway vehicle in opposite directions over a stretch of single track between terminal stations. However, it should be understood at this time that similar control of other types of vehicles, over other forms of rights-of-way, may also be provided in accordance with the present invention without in any manner departing from the spirit or scope thereof.

In accordance with the present invention, it is generally proposed to utilize programming means, conditioned in accordance with the desired direction of travel of an unmanned vehicle, for controlling the direction of travel of such vehicle. These programming means then condition certain wayside code transmitting means to transmit vehicle control information to the vehicle indicative of the desired performance of the vehicle, in the desired direction, over a stretch of right-of-way. Thus, in the selected embodiment shown herein, programming means are utilized to record the desired direction of travel of a railway passenger vehicle, operating between two terminal stations on a stretch of single track, in accordance with a predetermined time schedule for the railway vehicle. The condition of these programming means then dictates in what direction speed control track code will be transmitted, through the track rails, to the railway vehicle.

Although the above discussion is concerned with the transmission of track codes in one direction or the other, in accordance with the desired direction of vehicle travel, it should be understood at this time that the vehicle control information, concerning the desired vehicle performance in each direction of vehicle travel, may be rendered distinctive from corresponding vehicle control information for the opposite direction of vehicle travel in other manners besides the direction of transmission. Thus, the carrier frequencies of the information might be distinctive of the desired direction of vehicle travel or, some other characteristic of the transmission may be utilized to distinguish the vehicle control transmissions for one direction of vehicle travel from the corresponding transmissions for an opposite direction of vehicle travel.

It is further proposed in accordance with the present invention to utilize a vehicle carried direction registration, provided in accordance with the desired direction of vehicle travel, for causing only the vehicle control information for this desired direction to be effective on the vehicle for controlling the speed thereof in this desired direction. Thus, in the selected embodiment shown herein the railway vehicle is equipped with receiving means at either of its ends for respectively receiving the speed control track code transmissions from the wayside and the two ends of the railway vehicle are interlocked, in accordance with the vehicle direction registration, so that only speed control track code transmissions for the desired direction of travel of the railway vehicle are effective to control the speed of the railway vehicle over the stretch of single track.

In accordance with the present invention, it is also proposed to provide interlocking circuit means responsive to the condition of the vehicle brake system so that this vehicle brake system may be interlocked with the operation of the vehicle power unit, for example, to prevent the application of power to the vehicle while the vehicle brakes are being applied.

It is further proposed to provide reverse control means which are effective, in accordance with the above mentioned programming means, to reverse the direction registration of the system for causing only the vehicle control information for the opposite direction of vehicle travel to be effective to control the speed of the vehicle in this opposite direction. For example, in the selected embodiment shown herein, loop circuit means are provided, at the respective terminal stations of a stretch of single track, which are effective after the railway passenger vehicle has arrived at the associated terminal station to reverse the direction registration both on the wayside and on the railway vehicle so that only speed control track codes for the opposite direction of vehicle travel are effective to control the speed of the railway vehicle in this opposite direction toward the opposite terminal station.

In view of the above discussion, one object of the present invention is to provide a vehicle remote control system for controlling the operation of an unmanned vehicle in opposite directions over a right-of-way.

Another object of the present invention is to provide a registration of the desired direction of vehicle travel on a right-of-way and to utilize this direction registration for causing only vehicle control information for the desired direction of vehicle travel to be effective to remotely control a vehicle in this desired direction.

A further object of the present invention is to provide a vehicle remote control system for remotely controlling a vehicle in opposite directions over a right-of-way, wherein programming means, conditioned in accordance with a predetermined time schedule for the vehicle, control the direction of travel of the vehicle.

A further object of the present invention is to provide means for interlocking the operations of the brake and power unit systems of a remotely controlled vehicle..

A further object of the present invention is to provide a vehicle remote control system for controlling the operation of an unmanned vehicle in opposite directions over a right-of-way wherein speed control codes for one direction of vehicle travel are distinctive from corresponding speed control codes for the opposite directions of vehicle travel.

A further object of the present invention is to provide for reversing the direction registration in a vehicle remote control system whereby a vehicle may be remotely controlled during a shuttle operation between right-of-way terminals.

A more specific object of the present invention is to provide a remote control system for remotely controlling the shuttle operation of a passenger carrying vehicle between right-of-way terminals.

Other objects, purposes and characteristic features of the present invention will be in part obvious from the accompanying drawings and in part pointed out as the description of the present invention progresses.

In describing the invention in detail, reference will be made to the accompanying drawings in which:

FIG. 1 illustrates the wayside apparatus, according to the selected embodiment of the present invention, for transmitting vehicle control information from the wayside to a passenger vehicle, operating between terminal stations on a stretch of single track.

FIGS. 2A through 2J (except that 2I has been omitted) illustrates the vehicle carried apparatus, according to the same embodiment of the present invention.

FIG. 3 is an arrangement diagram for illustrating the proper positioning of FIGS. 2A through 2J.

In order to simplify the illustrations of the drawings and facilitate in the explanation of the fundamental characteristics of the invention, various parts and circuits have been shown diagrammatically in accordance with the conventional symbols. Arrows with the associated symbols (BX) and (NX) are employed to indicate connections of the circuits to the opposite terminals of a suitable source of alternating current for the application of track code rates to the track rails, whereas the symbols (+) and (−) are employed to indicate connections of the various relay circuits to the opposite terminals of a suitable source of current for the energization of such relay; and the source of current may be any suitable character for the purpose intended. In addition, the symbols (A+) and (C+) have been utilized, in the selected embodiment, to indicate connections of the certain relays carried on the vehicle to be controlled, and, it is intended here that such symbols (A+) and (C+) will be representative of the connections of these various relay circuits to a suitable source of power, on the vehicle, when the vehicle is converted from manual to automatic operation, as will be described in detail hereinafter. The various contacts of the relays involved in the illustrations are shown conventional as being in a lower or inclined position when the coil or winding of the associated relay deenergized and in a raised or horizontal position with the relay energized; the contacts belonging to any given relay are shown connected to its coil or windings by dotted lines and these contacts may be either below or above the illustration of the relay winding. The front and back contacts between which the movable contacts are operated by the different relays are shown conventional as arrow heads, and the movable contacts are normally of the type which have their contacts pulled downwardly by gravity or by spring action.

WAYSIDE APPARATUS

Referring now to FIG. 1 of the accompanying drawings, a stretch of single track is illustrated and extends between terminal stations WS and ES. This stretch of single track is then divided into track sections 1T through 5T and each of these track sections is equipped with a track relay TR. In accordance with normal railway signalling procedures, each of the track relays is normally energized as part of a conventional track circuit (current source not shown) and a track relay TR will become deenergized when the associated track section is occupied with a railway vehicle.

A direction registration relay DIR is provided and, in the selected embodiment of the present invention, this relay is of a magnetic stick type which assumes one or the other of its operating positions in accordance with the polarity of energizing current to its winding and which remains in its last operated position after the winding is deenergized.

The selective energization of this direction registration relay DIR is dependent upon the position of the illustrated programmer switch PS which, in turn, is operated for either a desired east or westbound move, by an automatic programmer PR, preset in accordance with the predetermined time schedule for the railway vehicle and furthermore receiving an indication of the actual time from timer TM. This programmer PR may be of any suitable form, for the purposes intended; i.e. the selective actuation of programmer switch PS in accordance with this predetermined time scheduled. The designation YY in the energizing circuits for direction registration relay DIR refers to the various conditions, well known to those skilled in the art, that normally would be met before a change in the condition of relay DIR is obtained such as, for example, a checking of certain track relays TR to make sure that the vehicle V is properly positioned on the stretch of track.

The various speed control track codes transmitted through the track rails of the illustrated stretch of single track are formed by a plurality of code transmitting relays CT which selectively energize the ends of the illustrated track sections in accordance with the condition of the wayside direction registration relay DIR and although no energizing circuits have been shown for these code transmitters CT, it is intended here they are continually energized to operate at their respective control code rate. From the above discussion, and with reference to FIG. 1 of the accompanying drawings, it will be noted that the direction of code transmission through the illustrated stretch of single track is distinctive of the desired direction travel of the passenger vehicle V.

In the selected embodiment shown herein, certain conditions are necessary before a control code is applied to a given track section. For example, a 270 code rate is applied to the right-hand end of track section 3T, for an eastbound move, only when the vehicle V enters section 3T (relay 3TR drops away) and track relay 4TR is picked up, to indicate that section 4T is unoccupied. In addition, the designations XX, in FIG. 1, are intended to represent various other conditions, dictated by the requirements of practice, that would normally be met before a specific track section is coded.

Without attempting to limit the scope of the present invention it is intended, in the selected embodiment, that the application of a 270 code rate to a track section will be indicative of a high speed vehicle control for that section; i.e. the vehicle is permitted to traverse the section at its nominal high running speed. Furthermore, the coding of a track section with a 180 code rate is intended here to be indicative of a vehicle control calling for a predetermined reduction in the vehicle speed, in preparation of entrance of the vehicle into a terminal station. With this in mind, it will be noted, in FIG. 1, that track section 3T is always supplied with a high speed 270 code rate whereas track sections 2T and 4T are selectively energized with either a 180 or a 270 code rate, dependent upon the desired direction of travel for the vehicle, as registered on the wayside direction registration relay DIR. In addition, certain of the track sections, 1T and 5T, do not receive a track code, and it is intended here that such a "no code" condition will be indicative of a full stop vehicle control.

Although the vehicle V is provided with speed governing apparatus, to be described hereinafter, for automatically controlling vehicle speed in accordance with the various control track codes, certain wayside apparatus, including trip stops TS and speed determining apparatus SD, has been provided to check that the vehicle V is properly responding to these various control track codes; i.e. to check the integrity of the vehicle carried speed governing apparatus. More specifically, these trip stops W-TS and E-TS are assumed to be that type which is normally in its "stop" or brake tripping position wherein it will contact a vehicle carried brake trip switch (not shown) and is lowered to a "clear" position, in advance of the vehicle, in accordance with the condition of the associated wayside speed determining apparatus SD. For example, speed determining apparatus W-SD checks on the actual speed of the vehicle V as it approaches track section 2T, in a westbound direction, and lowers trip stop W-TS to its "clear" position as long as the vehicle V is not exceeding its predetermined maximum permissive speed, and, this speed determining apparatus W–SD may be of any suitable form, for providing this speed check, such as preset timing means for checking the time required for the vehicle V to travel between two predetermined locations on the illustrated stretch of single track. Similarly, trip stop E–TS and speed determining apparatus E–SD operate to provide a wayside speed check when the vehicle V is travelling in an eastbound direction along the illustrated stretch of single track. Furthermore, although only two such trip stops have been shown in FIG. 1, it should of course be understood that additional wayside speed checks could also be provided at other locations along the illustrated stretch of track, depending upon the requirements of practice, if periodic wayside checks on the vehicle speed are desired.

The motor driven timer TE and relays BT, TEP and 120A, associated with each of the terminal stations, form a timing circuit organization initiated when the vehicle approaches the associated terminal station for insuring a certain predetermined minimum stay, of the vehicle, at the station and also causes a 120 code rate to be properly applied to certain loop circuits associated with the terminal stations, to be communicated to the vehicle, for performing certain functions on the vehicle, as will be described in detail hereinafter.

The normal position of a vehicle, after having stopped at a terminal station is typicaly illustrated in FIG. 1 by the dotted representation of a passenger vehicle V situated at terminal station ES. From this dotted representation it will be noted that the respective ends of the vehicle, west end WE and east end EE, are respectively adjacent loop circuits 4L and 5L, of track sections 4T and 5T, so that the associated receiving coils W–RC and E–RC may inductively receive the 120 code rate carried by these loop circuits. Similarly, when the vehicle V occupies station WS, receiver coils W–RC and E–RC will be adjacent loops 1L and 2L respectively.

VEHICLE CARRIED APPARATUS

Referring now to FIGS. 2A through 2J (except that 2I has been omitted) the vehicle carried apparatus is illustrated, in accordance with the selected embodiment of the present invention.

More specifically, FIGS. 2A through 2D illustrate the control apparatus carried on the west end WE of the vehicle V, FIGS. 2F through 2J illustrate the control apparatus carried on the east end EE of the vehicle V, and FIG. 2E illustrates the vehicle apparatus (vehicle power unit, vehicle brake system, etc.) to be controlled in accordance with the condition of the control apparatus on the respective ends of the vehicle. However, since the control apparatus at one end of the vehicle is substantially the same as that at the other vehicle end, a general description of the control apparatus of only one end will be presented and the interaction of the two ends of the vehicle, during operation, will be given when the detailed operational description is presented.

Referring now to FIGS. 2A through 2D, the west end WE of the vehicle is provided with a manual-to-automation relay W–MAR, which when picked up connects the various automation relays, associated with vehicle end WE, to a suitable source of current carried on the vehicle (such as the car battery). This connection of the automation relays, to a suitable source of current, is illustrated, in FIG. 2D, by the symbol (A+), which is connected directly to the positive terminal (+) of a suitable source of current, when relays W–MAR is manually picked up to start the automation equipment on vehicle end WE.

Included in the automation relays, of vehicle end WE, are relays W–LE, W–LES, W–LESP, W–TR and W–TRS, which together with the corresponding relays on vehicle end EE, provide a vehicle carried direction registration of the desired direction of vehicle travel. Although these relays are automatically controlled, as the passenger vehicle V (see FIG. 1) operates between one terminal station and another, manual push buttons W–LEPB and W–TRPB are provided in FIG. 2B, to manually initiate a direction registration on end WE, when placing the vehicle in service.

As mentioned previously, receiver coils W–RC, of FIG. 2A, receive the 180 and 270 speed control code rates transmitted through the rails of the illustrated stretch of single track, for a westbound move of the vehicle V, and furthermore, receive the 120 code rates supplied to loop circuits 1L and 4L, of FIG. 1, depending upon whether the vehicle V is occupying terminal station WS or ES. These code rates, received by receiver coils W–RC are then applied through amplifilter W–AF and transformer W–T, of FIG. 2A, to cause coding relay W–CR to be intermittently energized at the received code rate. Conventional decoding units W–270DU, W–180DU and W–120DU, of FIGS. 2A and 2B, then decode the received code rates and selectively energize associated code repeater relays W–270R, W–180R and W–120R, which provide a vehicle registration of these received control code rates. The selective energization of code repeater relays W–180R and W–270R are then utilized, in a speed governing organization, for controlling the speed of the vehicle V in accordance with these received speed control code rates.

More specifically, the speed governing organization, provided in the selected embodiment of the present invention, includes an axle driven frequency generator W–ADFG whose output frequency is directly proportional to the actual speed of the vehicle V, a plurality of high-pass speed filters W–SF each capable of passing all frequencies above that for which the filter has been preset, an oscillator W–O1 which normally provides a frequency output which is high enough to pass through any of the filter W–SF, and an amplifier W–A1 for amplifying the respective outputs from the axle driven frequency generator W–ADFG and oscillator W–O1 for application to the various high-pass speed filters W–SF.

This plurality of speed filters W–SF is divided into two speed range groups; the first including the 30 and 32 m.p.h. filters, and the second including the 5, 7 and 16 m.p.h. filters. One or the other of these groups of speed filters is connected to the output of amplifiers W–A1 as determined by the selective energization of relays W–180R and W–270RP of FIG. 2A, and the particular speed designations for the filters of each filter group are preset in accordance with the predetermined safe running speeds, for the vehicle V, in the 180 and 270 code territories. It should, of course, be understood that the illustrated speed designations for filter W–SF are chosen merely to facilitate in the present disclosure, and that other such speed designations may be used depending upon the requirements of practice.

Relay W–SG is the output relay of the speed filters W–SF and is picked up only so long as the output frequency of amplifier W–A1 is being passed by the particular speed filter connected to this amplifier W–A1. This relay W–SG together with various repeater relays W–SGP, W–SGPCP and W–SGPCPCP provide a relay registration indicative of the comparison of the actual speed of the passenger vehicle V to the predetermined safe running speeds called for by the various speed filters W–SF and the speed control track codes.

The above mentioned speed governing circuits are then utilized to selectively energize a plurality of traction motor control wire which control the vehicle traction motors illustrated in FIG. 2E, for westbound movement of the passenger vehicle V. Referring now to FIG. 2D, the traction motor control wires, associated with the west end WE of the vehicle V, are respectively labeled as SWITCHING, PARALLEL, SERIES and DYNAMIC BRAKING control wires.

More specifically, if only the SWITCHING control wire of FIG. 2D is energized, the vehicle traction motors of FIG. 2E are energized to propel the passenger vehicle V in the westbound direction, in some minimum power setting, at the so called "balance speed" for the vehicle which might be, for example, somewhere near 7 m.p.h. However, if the SWITCHING, SERIES and PARALLEL traction motor control wires are simultaneously energized, the vehicle traction motors, of FIG. 2E, are energized to progressively increase the westbound speed of the vehicle V toward some predetermined maximum "balance speed" which might be, for example, near 50 m.p.h.

Referring to FIG. 2H of the accompanying drawings, the east end EE of the vehicle V is similarly equipped with corresponding traction motor control wires for controlling the speed of the vehicle V in an eastbound direction. Furthermore, it should be pointed out at this time that the selective energization of the SWITCHING traction motor control wires, of FIGS. 2D and 2H respectively, determines the direction of travel of the vehicle V by controlling, for example, the field connections on the vehicle traction motors of FIG. 2E with respect to the armature connections.

Magnet valves SBMV, EBMV and CMV are provided, in FIG. 2E for controlling the vehicle air brake apparatus while the vehicle V is under automatic control. Thus, magnet valve SMBV is deenergized to provide a service application of the vehicle brakes, magnet valve EBMV is deenergized to provide an emergency application of the vehicle brakes and magnet valve CMV is energized to charge up the vehicle air brake pipe, when placing the vehicle V into automatic operation.

Certain pressure switches W–BAPS, W–BOPS, and W–BPPS are provided, in FIG. 2B, to interlock the operation of the vehicle air brake system with that of the vehicle traction motors. Thus, pressure switches W–BOPS and W–BAPS operate their associated contacts to indicate when the vehicle air brakes are fully released and fully applied respectively, in accordance with the air pressure existing, for example, in the straight air pipe and in the brake cylinders respectively of the vehicle V. Furthermore, pressure switch W–BPPS closes its contact when the air brake pipe is fully charged, and as will be described in detail hereinafter, this is one condition that must be met before the vehicle V may be placed into automatic operation.

Since the vehicle V is considered in the selected embodiment to be a passenger vehicle, door control apparatus and destination displays for the vehicle are provided in FIG. 2E, and are automatically controlled, in accordance with the automation control apparatus on the respective ends of the vehicle V. For example, the vehicle door control apparatus is properly operated to open and close the vehicle doors (not shown) when the vehicle V occupies terminal stations WS and ES, and the destination signs of FIG. 2E are properly operated to give an indication of the destination of passenger vehicle V. More specifically, door control switch DCS is provided in FIG. 2E to close its front contact only when the vehicle doors (not shown) are closed and locked, and switch DOS closes its front contact only when the doors are fully opened. Although the operating mechanism, for actuating these switches has not been shown, it will be assumed here that they may be of any suitable form, such as cam operated switches or the like, for respectively performing their designated operations. These switches DCS and DOS then operate, generally speaking, to selectively energize relays DOR and S to indicate that the doors to vehicle V have been opened and are subsequently closed and locked, before the vehicle V may be dispatched from one terminal station to the other.

A motion detection relay W–MD, of FIG. 2A, is also provided which is energized, as long as the speed of the vehicle is above some predetermined minimum speed, such a 2 m.p.h. This motion detection relay W–MD is then utilized to prevent operation of the vehicle doors while the vehicle is in motion and further causes an emergency brake application, as will be described hereinafter, if the vehicle speed should drop below some predetermined minimum between stations, because of some malfunctioning of the control system, traction motors, etc. This would prevent the vehicle from rolling backwards on a grade.

Figure 2C:
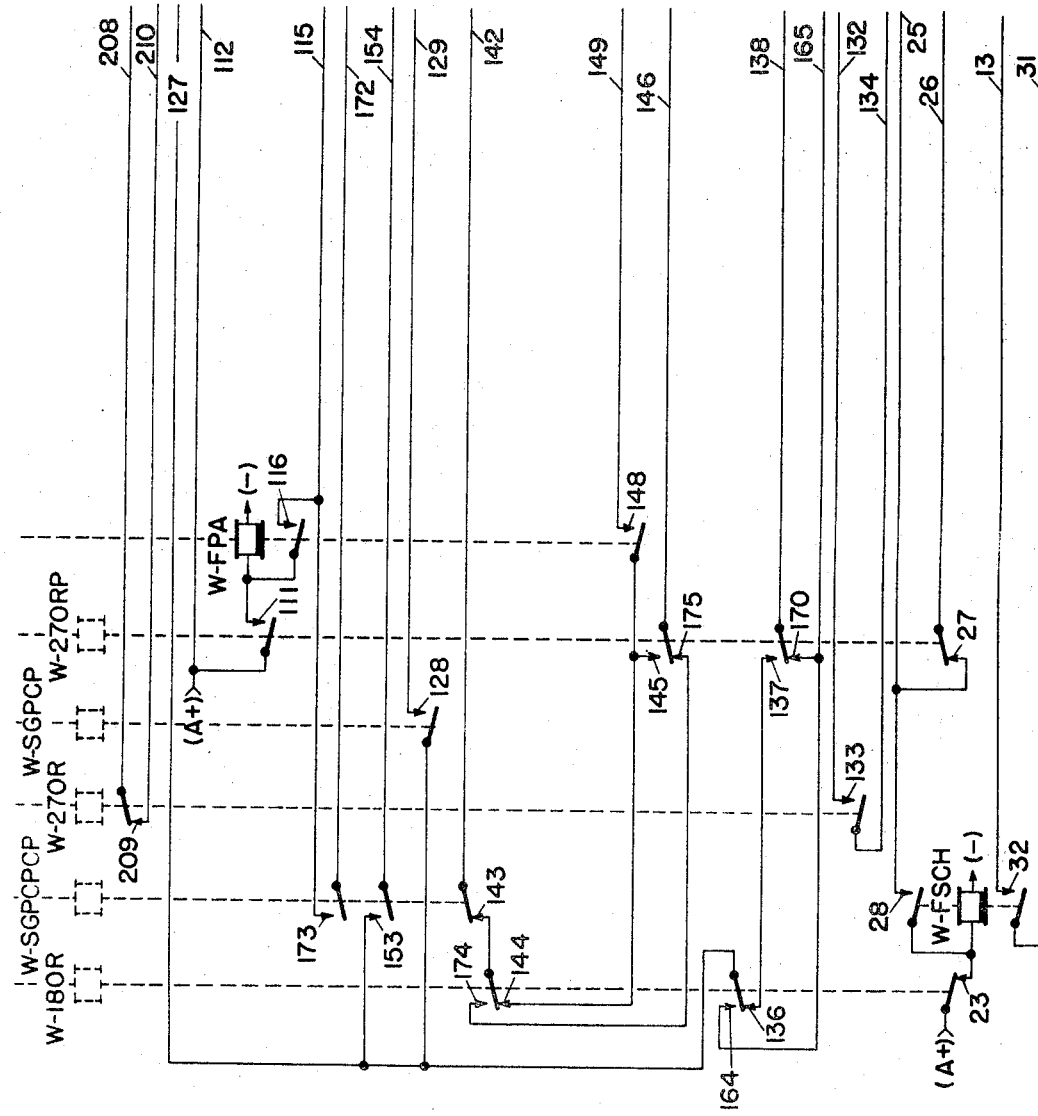
Figure 2F:
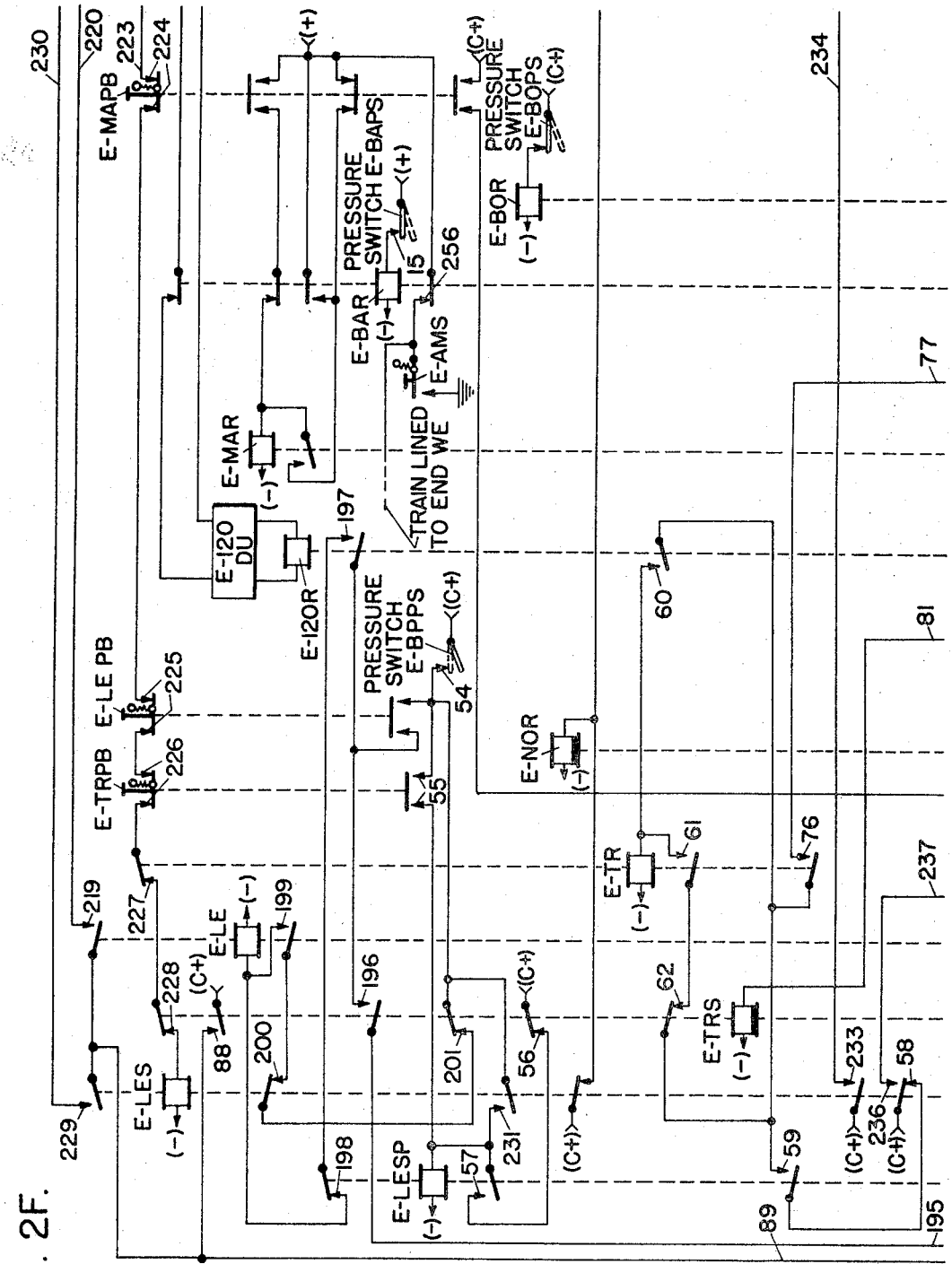

Although the present invention is primarily concerned with the automated control of a vehicle, manual vehicle control apparatus has been provided in FIGS. 2D and 2H of the selected embodiment for manually controlling the passenger vehicle V, via the wires labelled MAN in FIGS. 2D, 2E and 2H, when the manual-to-automatic relays W–MAR of FIG. 2B and E–MAR of FIG. 2F are deenergized. Thus, the vehicle V may be manually controlled when placing it in service, at terminal stations WS and ES.

Having thus described the general organization of one embodiment of the present invention, a detailed consideration of this embodiment will now be given upon considering typical operations of the passenger vehicle V between the illustrated terminal stations WS and ES.

OPERATION

Before beginning a detailed description of the operation of the selected embodiment shown herein, it is first considered desirable to establish the normal operating conditions of the illustrated circuit organizations in order to establish a basis for such a subsequent operational description.

Referring now to FIG. 1 of the accompanying drawings, it will be assumed that programmer switch PS is initially in its right-hand or eastbound position E due to some previous vehicle traffic on the illustrated stretch of single track and furthermore that direction registration relay DIR has been energized, as will be discussed hereinafter, to close its lower or back contacts. Since relay DIR is a magnetic stick type relay, it remains in this assumed position, indicative of the assumed previous eastbound traffic when its winding is deenergized. Furthermore, it will now be assumed that no vehicle occupies the stretch of single track so that each of the illustrated track relays will initially be energized. In addition, since the code applying circuit, to each of the illustrated track sections, extends through a back contact of the associated track relay TR, no track codes are currently being applied to the illustrated track sections.

In order to fully discuss the operation of the selected embodiment shown herein, it will now be assumed that a passenger vehicle V is to be placed into service at station ES in FIG. 1, and furthermore, that this vehicle V is manually operated by the manual vehicle control apparatus of FIGS. 2D and 2H to occupy terminal station ES where it will be assumed that a full service brake application has been manually provided to stop the vehicle V in station ES, with receiver coils W–RC, of FIG. 2A, adjacent loop circuit 4L and receiver coils E–RC, of FIG. 2G, adjacent loop circuit 5L. It will be noted in FIGS. 2D, 2E and 2H in the accompanying drawings that during this manual operation of the passenger vehicle V, the service brake magnet valve SBMV, of FIG. 2E is normally energized by a circuit extending, for example, from (+) in FIG. 2D, through back contact 10 of relay W–MAR, along wire 11 between FIGS. 2D and 2E, and to (−). Furthermore, the emergency brake magnet valve EBMV, of FIG. 2E, is normally energized during the manual operation by a circuit extending, for example, from (+) in FIG. 2D, through back contact 12 of relay W–MAR, along wire 13 between FIGS. 2D and 2E, and to (−).

Pressure switches W–BAPS, W–BOPS, E–BAPS and E–BOPS, of FIGS. 2B and 2F, now close their associated contacts to indicate this assumed full service brake application manually provided for positioning the vehicle V at terminal station ES. Referring to FIGS. 2B and 2F, the closure of contacts 14 and 15 of pressure switches W–BAPS and E–BAPS respectively then complete the energizing circuits for the associated relays W–BAR and E–BAR, which registers this full service application of the vehicle brakes, on the respective ends of the vehicle V. It will be noted in FIGS. 2B and 2F that the closure of pressure switches W–BAPS and E–BAPS are necessary before the manual-to-automatic relays W–MAR and E–MAR may be energized to turn on the automation equipment associated with these respective ends of the vehicle V. In order to place the vehicle V into automatic operation, push buttons W–MAPB and E–MAPB, of FIGS. 2B and 2F respectively, are provided for respectively energizing the associated manual-to-automatic relays W–MAR and E–MAR of FIGS. 2B and 2F.

Assuming now that manual push button W–MAPB is depressed, a pick-up circuit is established for relay W–MAR extending from (+), through contacts 16 of push button W–MAPB, front contact 17 of relay W–BAR, and to (—). When the push button W–MAPB is subsequently released, relay W–MAR is maintained in a picked up position by a stick circuit extending from (+), through contacts 18 of push button W–MAPB, front contact 19 of relay W–MAR, and to (—). Furthermore, when push button W–MAPB is depressed, the charge magnet valve CMV, of FIG. 2E, is now energized, to charge up the vehicle brake pipe in preparation to the automatic operation, by a circuit extending from (A+) in FIG. 2B, through contacts 20 of push button W–MAPB, along wire 21 between FIGS. 2B, 2D and 2E, and to (—). Referring now to FIG. 2F of the accompanying drawings, it will be noted that relay E–MAR is energized in turn on the automation equipment associated with vehicle end EE, by the depression of push button E–MAPB, in substantialy the same manner as that just described for the energization of relay W–MAR on vehicle end WE.

With manual-to-automatic W–MAR now picked up, the vehicle carried power source, designated in FIG. 2D by the reference character (+), is now connected to the automation relays on vehicle end WE through front contact 22 of relay W–MAR. As mentioned previously, this connection of the automation relays to the vehicle carried power source is represented by the symbol (A+) of FIG. 2D. Similarly, the energization of relay E–MAR, of FIG. 2F, completes the connection of the vehicle carried power source to the automation relays associated with vehicle end EE. As mentioned earlier, this connection is diagrammatically represented in FIG. 2H, by the symbol (C+).

Relays W–FSCH and E–FSCH, of FIGS. 2C and 2J respectively, are now energized by similar circuits which extend, for example, for relay W–FSCH, from (A+) in FIG. 2C, through back contact 23 of relay W–180R, and to (—). At the same time, a stick circuit is completed for relay W–FSCH and extends from (A+) in FIG. 2D, through either front contact 24 of relay W–BAR and along wire 25 between FIGS. 2D and 2C, or along wire 26 between FIGS. 2D and 2C and through back contact 27 of relay W–27RP, through front contact 28 of relay W–FSCH, and to (—). Furthermore, relays W–NOR and E–NOR of FIGS. 2B and 2F respectively, are energized, upon picking up of relays W–MAR and E–MAR respectively, by energizing circuits which extend, for example, for relay W–NOR, from (A+) in FIG. 2B, through back contact 29 of relay W–LES, and to (—).

It will be noted in FIGS. 2D and 2H, that when the manual-to-automatic relays W–MAR and E–MAR were picked up, as described above, no energizing circuit then exists for the service brake valve SBMV of FIG. 2E, and therefore, this magnet valve SBMV is now deenergized to retain the service application of the vehicle brakes, when shifting from manual to automatic operation. However, a new energizing circuit is completed for magnet valve EBMV extending from (A+) in FIG. 2D, through front contact 30 of relay W–NOR, along wire 31 between FIGS. 2D and 2E, through front contact 32 of relay W–FSCH, and along wire 13 between FIGS. 2C, 2D and 2E.

Referring now to FIG. 1, it will be noted that the presence of the passenger vehicle V at terminal station ES, causes drop away of track relays 4TR and 5TR. With track relay 4TR dropped away, a 120 code rate is now simultaneously applied to loop circuits 4L and 5L by a circuit extending from (BX), through back contact 33 of relay DIR, back contact 34 of relay 4TR, front contact 35 of code transmitter 120CT, back contact 36 of relay E–BT, through loops 4L and 5L, and to (NX). At the same time, an energizing circuit is completed for relay E–120A extending from (+), through back contacts 37, 38, 39 and 40 of relays 4TR, 5TR, E–BT and E–TEP respectively, and to (—). The picking up of relay E–120A is is utilized for insuring a certain predetermined minimum time application of the 120 code rate to loop circuits 4L and 5L for purposes which will become clear as the discussion progresses. It will also be noted in FIG. 1 that an energizing circuit for motor driven timer E–TE is now also completed by the closure of back contacts 37, 38 and 39 of relays 4TR, 5TR and E–BT so that timer E–TE begins its timing operation, at the completion of which relay E–TEP will be energized by the closure of front contact 40a of timer E–TE.

Receiver coils W–RC and E–RC on ends WE and EE respectively of the vehicle V now receive this 120 code rate applied to loop circuits 4L and 5L so that relays W–120R and E–120R, of FIGS. 2B and 2F respectively, are new energized to register the reception of this 120 code rate at the respective ends of the vehicle V. For example, relay W–120R of FIG. 2B, is picked up by the intermittent energization of decoding unit W–120DU through a circuit extending from (A+) in FIG. 2A, through movable contact 41 of relay W–CR, back contact 42 of motion detector relay W–MD, along wires 43 between FIGS. 2A and 2B, and through front contact 44 of relay W–BAR.

INITIAL DIRECTION REGISTRATION

Manual push buttons LEPB and TRPB are provided at either end of the vehicle V (see FIGS. 2B and 2F) for manually registering the desired direction of vehicle travel when placing the vehicle V in service. Since the vehicle V is to operate from station ES in FIG. 1, toward station WS, push button W–LEPB of FIG. 2B, is now depressed to establish vehicle end WE as the leading end out of station ES. Assuming now that the brake pipe has been fully charged, by the aforementioned energization of magnet valve CMV, of FIG. 2E, so that pressure switch W–BPPS is closed, relay W–LE is now energized by a circuit extending from (A+) in FIG. 2B, through contact 45 of pressure switch W–BPPS, contacts 46 of manual push button W–LEPB, front contact 47 of relay W–120R, back contact 48 of relay W–LESP, and to (—). Subsequently, relay W–LE is stuck in this picked up position by a circuit extending from (A+), through contact 45 of pressure switch W–BPPS, back contact 49 of relay W–TRS, back contact 50 of relay W–LES, front contact 51 of relay W–LE, and to (—). It will be noted in FIG. 2D, that this picking up of relay W–LE completes the energizing circuit for the westbound destination sign of FIG. 2E, extending from (A+) in FIG. 2D, through front contact 52 of relay W–LE, along wire 53 between FIGS. 2D and 2E, and to (—).

Since it has been assumed that the vehicle V is to travel from station ES to station WS, and therefore that vehicle end EE is to trail out of station ES, manual push button E–TRPB, of FIG. 2F, is momentarily depressed to pick up relay E–LESP of FIG. 2F, by a circuit extending from (C+) in FIG. 2F, through contact 54 of pressure switch E–BPPS, which checks that the brake pipe is fully charged, through contacts 55 of push button E–TRPB, and to (—). Subsequently, relay E–LESP is stuck in a picked up position by a circuit extending from (C+), through back contact 56 of relay E–TRS, front contact 57 of relay E–LESP, and to (—). Relay E–TR, of FIG. 2F, is now also energized by a circuit extending from (C+) in FIG. 2F, through back contact 58 of relay E-LES, front contact 59 of relay E-LESP, front contact 60 of relay E-120R, and to (−). Relay E-TR is then provided with a stick circuit including its own front contact 61 and back contact 62 of relay E-TRS.

With the 120 code rate being received on vehicle end EE, the door unlock wide DU, of FIGS. 2H and 2E, is now energized, to unlock the vehicle doors by a circuit extending from (C+) in FIG. 2H, through front contact 63 of relay E-120R, back contact 64 of relay E-TRS and through back contact 65 of relay E-LE. With relay W-LE, of FIG. 2B, now picked up, as previously described, the door open wire DO, of FIGS. 2D and 2E, is now energized by a circuit extending from (A+) in FIG. 2D, through front contact 66 of relay W-120R, back contact 67 of relay W-TRS and through front contact 68 of relay W-LE. At this time, the vehicle doors are opened to permit the entrance of passengers into the passenger vehicle V, for the trip from station ES to station WS, and, it should be noted here that the vehicle doors are unlocked from one end of the vehicle V and opened by the other end, thus, detecting proper operation of apparatus on both ends of the vehicle V.

Referring now to FIG. 2E of the accompanying drawings, when the vehicle doors are unlocked, switch DCS is operated to open its front contact 69, and, as soon as the doors are opened, as described above, switch DOS closes its front contact 70 and thereby causes pick up of relay DOR by the obvious pickup circuit of FIG. 2E. Relay DOR is thereafter retained in its picked up position by a stick circuit extending from (A+), through back contact 71 of relay S, front contact 72 of relay DOR, and to (−). As mentioned previously, the picking up of relay DOR checks that the doors of the vehicle V have been opened during a station stop.

From the above discussion, and with reference to FIG. 1 of the accompanying drawings, it will be noted that the energizing circuit to motor driven timer E-TE is completed through the back contacts 37, 38 and 39 of relays 4TR, 5TR and E-BT respectively. After timer E-TE completes its timing operation, and closes its front contact 40a, the energizing circuit for relay E-120A is then interrupted by the opening of back contact 40 of relay E-TEP. Relay E-120A is slow drop away in nature and after this drop time has elasped, the left-hand side of the winding for direction registration relay DIR is connected to (−) through front contact 73 of relay E-TEP and back contact 74 of relay E-120A. However, direction registration relay DIR is not energized until called for by programmer PR, which has been preset in accordance with the vehicle time schedule.

Assuming now that programmer PR, of FIG. 1, operates programmer switch PS to its left-hand or westbound position W, direction registration relay DIR is now energized to close its upper or front contacts by a circuit which extends from (+), through contact 75 of programmer switch PS, front contact 73 of relay E-TEP, back contact 74 of relay E-120A, and to (−). As mentioned previously, direction registration relay DIR is a magnetic stick type and therefore remains in this last operated position, wherein its front contacts are closed, even though its energizing circuit may subsequently be interrupted.

When relay DIR assumes its picked up position, as described above, the 120 code rate is removed from loop circuits 4L and 5L, by the opening of front contact 33 of relay DIR. This causes relay W-120R and E-120R, of FIGS. 2B and 2F respectively, to drop away, thus opening the energizing circuits to the door control wires DU and DO, of FIGS. 2D, 2E and 2H, at front contacts 63 and 66 of relays E-120R and W-120R respectively. The doors of the vehicle V are now closed and locked by the door control apparatus of FIG. 2E.

Relay E-TRS of FIG. 2F is now energized by a circuit extending from (C+) in FIG. 2F, through back contact 58 of relay E-LES, front contact 59 of relay E-LESP, front contact 76 of relay E-TR, along wire 77 between FIGS. 2F, 2H and 2J, through back contact 78 of relay E-270R, along wire 79 between FIGS. 2J and 2H, through back contact 80 of relay E-120R, along wire 81 between FIGS. 2H and 2F, and to (−). After picking up, E-TRS is stuck in a picked up position by a circuit extending from (C+) in FIG. 2H, through front contact 82 of relay E-TRS, back contact 80 of relay E-120R, along wire 81 between FIGS. 2H and 2F, and to (−). With relay E-TRS picked up, the stick circuit for relays E-TR and E-LESP are both interrupted, to drop these relays, by the opening of back contacts 62 and 56 respectively of relay E-TRS.

With direction registration relay DIR, of FIG. 1, in a picked up position, a 270 code rate is now applied to the left-hand end of track section 4T by a circuit extending from (BX), through front contact 83 of relay DIR, front contact 84 of track relay 3TR, front contact 85 of code transmitter 270CT, back contact 86 of relay 4TR, through the upper rail of track section 4T, through the train shunt provided by passenger vehicle V, and to terminal (NX) via the lower rail of track section 4T. The reception of this 270 code rate on vehicle end WE results in the energization of relay W-270R, of FIG. 2A, through the medium of decoding unit W-270DU.

Referring now to FIG. 2E of the accompanying drawings, when the doors were closed and locked, as described above, subsequent to the removal of the 120 code rate from loop circuits 4L and 5L, switch DCS closed its upper contact 69 and completed an energizing circuit for relay S extending from (A+), in FIG. 2E, through upper contact 69 of switch DCS, front contact 86a of relay DOR, and to (−). Since the switch DOS opened its front contact 70, upon closure of the vehicle doors, relay DOR is now dropped away, by the opening of back contact 71 of relay S, and opens its front contact 86a. However, relay S is maintained in a picked up position through its own front contact 87 to indicate that the vehicle doors are now closed and locked.

Relay W-LES, of FIG. 2B, can now be energized by a circuit extending from (C+) in FIG. 2F, through front contact 88 of relay E-TRS, along wire 89 between FIGS. 2F, 2H and 2E, through front contact 90 of relay S, back contact 91 of relay DOR, along wire 92 between FIGS. 2E, 2D and 2B, front contact 93 of relay W-LE, along wire 94 between FIGS. 2B and 2A, through front contacts 95 and 96 of relay W-270R, along wire 97 between FIGS. 2A and 2B, through contacts 98, 99 and 100 of push buttons W-MAPB, W-LEPB and W-TRPB respectively, back contact 101 of relay W-TR, back contact 102 of relay W-TRS, and to (−). Upon picking up, relay W-LES, of FIG. 2B, is stuck in this picked up position from the energy on wire 92, through its own front contact 103, along wire 104 between FIGS. 2B and 2A, through front contact 96 of relay W270R, along wire 97 between FIGS. 2A and 2B, through contacts 98, 99 and 100 of push buttons W-MAPB, W-LEPB and W-TRPB respectively, through back contacts 101 and 102 of relays W-TR and W-TRS respectively, and to (−).

With relay W-LES now picked up, an energizing circuit is completed for relay W-LESP, of FIG. 2B, extending from (+), through contact 45 of pressure switch W-BPS, front contact 105 of relay W-LES, and to (−). Relay W-LESP is then stuck up through its own front contact 106 and back contact 107 of relay W-TRS. In addition, this picking up of relay W-LES interrupts the existing stick circuit for relay W-LE, by the opening of back contact 50 of relay W-LES, to drop away relay W-LE. However, the westbound destination sign, of FIG. 2E, remains energized through front contact 107a of relay W-LES (see FIG. 2D). The vehicle carried direction registration has now been completed in accordance with the desired direction of vehicle travel from station ES to station WS.

Since the 270 code rate to track section 4T has caused relay W-270R, of FIG. 2A, to be picked up, repeater relay W-270RP can now also be energized by a circuit extending from (A+) in FIG. 2B, through front contact 108 of relay W-LES, along wire 109 between FIGS. 2B and 2A, through front contact 110 of relay W-270R, and to (−). Subsequently, relay W-FPA, of FIG. 2C, is now energized by a circuit extending from (A+) in FIG. 2C, through front contact 111 of relay W-270RP, and to (−). Since the brake release relay W-BRR, of FIG. 2D, has not as yet been energized to release the vehicle brakes, relay W-FPR is also provided with a stick circuit, for purposes discussed hereinafter, extending from (A+) in FIG. 2C, along wire 112 between FIGS. 2C and 2D, through front contact 113 of relay W-LESP, back contact 114 of relay W-BRR, along wire 115 between FIGS. 2D and 2C, through front contact 116 of relay W-FPA, and to (−).

TRACTION MOTOR CONTROL

Referring now to FIG. 2A of the accompanying drawings, it has previously been pointed out that the speed filters W-SF are of the high pass variety; i.e. each will pass all frequencies higher than that preset for the particular filter. Thus, the 30 m.p.h. filter will pass all frequencies indicative of vehicle speeds greater than 30 m.p.h.

Initially, reception on the vehicle V, of the 270 code rate now being applied to the left-hand end of track section 4T causes the 32 m.p.h. speed filter to be connected to the output of amplifier W-A1 through back contact 117 of relay W-180R, front contact 118 of relay W-270RP and back contact 119 of relay W-SGPCP. The output from oscillator W-O1 is amplified by amplifier W-AL and passes through the 32 m.p.h. filter to energize output relay W-SG. This picking up of relay W-SG then causes relay W-SGP to pick up by means of the obvious pick up circuit including front contact 120 of relay W-SG. However, as soon as relay W-SGP picks up, it open its back contact 121, thereby opening the illustrated circuit connection to oscillator W-O1 and therefore the operation of oscillator W-O1 is terminated. Since the vehicle V is not yet underway and therefore frequency generator W-ADFG produces no output, the shutting off of oscillator W-O1 causes relays W-SG and W-SGP to return to their initial deenergized positions, wherein oscillator W-O1 is once again operated to produce an output to amplifier W-A1, for picking up relays W-SG and W-SGP. Thus, it is seen that initially relays W-SG and W-SGP are intermittently picked up and released or, in other words, are initially in a coding condition.

This intermittent operation of relay W-SGP causes capacitor 122 to be intermittently charged through front contact 123 of relay W-SGP. During the time that relay W-SGP is dropped away the charge on capacitor 122 is then effective to energize relay W-SGPCP through back contact 124 of relay W-SGP, and therefore, it is seen that relay W-SGPCP is a code repeater of relay W-SGP; that is, relay W-SGPCP is picked up as long as relay W-SGP is coding. This picking up of relay W-SGPCP connects the 30 m.p.h. speed filter to the output of amplifier W-A1 through its front contact 125.

Brake release relay W-BRR, of FIG. 2D, is now energized by a circuit extending from (A+) in FIG. 2B, through front contact 126 of relay W-LES, along wire 127 between FIGS. 2B, 2D and 2C, through front contact 128 of relay W-SGPCP, along wire 129 between FIGS. 2C and 2D, and to (−). The brake release wire R of FIGS. 2D and 3E, is now also energized, to drain off the straight air pipe pressure, by a circuit extending from (A+) in FIG. 2D, through front contact 130 of relay W-LES, front contact 131 of brake release relay W-BRR, along wire 132 between FIGS. 2D and 2C, front contact 133 of relay W-270R, and along wire 134 between FIGS. 2C and 2D. It will be noted in FIG. 2D that front contact 135 of relay W-BOR is connected in multiple with front contact 133 of relay W-270R and is provided for reasons which will be discussed in detail hereinafter. At the same time, the service brake magnetic valve SBMV, of FIG. 2E, is energized to maintain the vehicle brakes released by a circuit extending from (A+) in FIG. 2B, through front contact 126 of relay W-LES, along wire 127 between FIGS. 2B, 2D and 2C, through back contact 136 of relay W-180R, front contact 137 of relay W-270RP, along wire 138 between FIGS. 2C and 2D, through front contacts 139 and 140 of relays W-BRR and W-MAR respectively, and along wire 11 between FIGS. 2D and 2E. As soon as the brakes of the vehicle V have been fully released, pressure switches W-BAPS and W-BOPS are opened, to drop away the relays W-BAR and W-BOR respectively.

The SWITCHING traction motor control wire, of FIG. 2D, is now energized, to cause the vehicle traction motors shown in FIG. 2E, to start moving the vehicle V towards station WS, by a circuit extending along wire 129 in FIGS. 2C and 2D, which is energized as previously described, through back contact 141 of relay W-BOR, which checks that the brakes are fully released, along wire 142 between FIGS. 2D and 2C, through back contacts 143 and 144 of relays W-SGPCPCP and W-180R respectively, front contact 145 of relay W-270RP, along wire 146 between FIGS. 2C and 2D, and through back contact 147 of relay W-BAR. Furthermore, the SERIES AND PARALLEL traction motor control wires, of FIG. 2D, are now simultaneously energized, to progressively increase the speed of vehicle V in this westbound direction, through front contact 148 of relay W-FPA, and along wire 149 between FIGS. 2C and 2D.

As the passenger vehicle V gets under way, the axle drive frequency generator W-ADFG, of FIG. 2A, starts producing an output, to amplifiers W-A1 and W-A2, the frequency of which is proportional to the actual speed of the vehicle V. Depending upon the preselected characteristics of filter W-MF, a speed will be reached (for example, at 2 m.p.h.) where motion detector relay W-MD will pick up, and, it is to be understood at this time that this speed may vary according to the requirements of practice. This picking up of motion detector relay W-MD closes its front contact 150, and now completes an energizing circuit for relay W-NOR, of FIG. 2B, extending from (A+) in FIG. 2A, through front contact 150 of relay W-MD, along wire 151 between FIGS. 2A and 2B, and to (−). With reference to FIG. 2B, it will be noted that the initial energizing circuit for relay W-NOR was interrupted when back contact 29 of relay W-LES is opened, due to the aforementioned pick up of relay W-LES. However, relay W-NOR is made slow releasing to bridge the normal time interval between the pick up of relay W-LES and the pick up of motion detector relay W-MD, just described. This retainment of W-NOR in its picked up position keeps the emergency brake magnet valve EBMV, of FIG. 2E, energized. However, it should be noted that if the vehicle V does not properly get underway, an emergency brake application will be initiated.

With the SERIES and PARALLEL traction motor control wires, of FIG. 2D, simultaneously energized, the speed of vehicle V steadily increases. As soon as the vehicle speed exceeds 30 m.p.h., the voltage signal developed by axle driven frequency generator W-ADFG, of FIG. 2A, is high enough to pass through the 30 m.p.h. filter, presently connected to amplifier W-A1, to maintain relay W-SG and its repeater relay W-SGP steadily picked up, even though oscillator W-O1 is shut off. Thus, the coding of relay W-SG and W-SGP is terminated and relay W-SGPCP is deenergized, thereby reconnecting the 32 m.p.h. filter to the output of amplifier W-A1.

Assuming that the vehicle speed lies somewhere between 30 and 32 m.p.h., with the 32 m.p.h. filter connected to the amplifier W-A1, the output of frequency generator W-ADFG, is not effective on relay W-SG and therefore relays W-SG and W-SGP again begin their coding operation, which in turn picks up relay W-SGPCP. The 30 m.p.h. filter is one again connected to the amplifier W-A1 and relays W-SG and W-SGP are once more steadily energized to drop relay W–SGPCP. Thus, with the vehicle speed between 30 and 32 m.p.h., relays W–SG and W–SGP alternately assume coding or steadily energized conditions, and in response, relay W–SGPCP is now in a coding condition wherein capacitor 152 is alternately charged and discharged to pick up relay W–SGPCPCP. This picking up of relay W–SGPCPCP opens its back contact 143, of FIG. 2C, and removes energy from the SWITCHING, SERIES and PARALLEL traction motor control wires of FIG. 2D, thereby removing all power to the vehicle traction motors of FIG. 2E, in order to keep the speed of the vehicle V relatively steady. Brake release relay W–BRR is maintained energized during this speed condition by a circuit including wire 127 in FIG. 2C, front contact 153 of relay W–SGPCPCP, and wire 154 between FIGS. 2C and 2D.

If the vehicle V does not properly respond to this loss of power at its traction motors and the vehicle speed increases above 32 m.p.h., because of track grade, etc., relays W–SG and W–SGP are steadily energized, by the output of frequency generator W–ADFG, while relay W–SGPCP and its code repeater relay W–SGPCPCP are steadily deenergized. With power off the vehicle traction motor control wires of FIG. 2D, brake release relay W–BRR is now deenergized since front contacts 128 and 153 of relays W–SGPCP and W–SGPCPCP respectively are both opened. The service brake magnet valve SBMV, of FIG. 2E, would now be deenergized, to provide a service brake application, by the opening of front contact 139 of relay W–BRR, in the previously described energizing circuit to magnet valve SBMV. Under this condition, as soon as the vehicle speed decreases to below 32 m.p.h., but above 30 m.p.h., relay W–SGPCP returns to a coding condition and relay W–SGPCPCP is once again picked up to energize brake release relay W–BRR, for removing the service brake application.

Assuming now that for some reason the vehicle speed drops below 30 m.p.h., while receiving a 270 code rate, relays W–SG and W–SGP are returned to their normal coding condition, to steadily energize relay W–SGPCP and drop relay W–SGPCPCP, and once again, the SWITCHING, SERIES and PARALLEL traction motor control wires, of FIG. 2D, are energized provided of course that back contact 141 of relay W–BOR is closed to indicate that the vehicle air brakes are fully released. From the above discussion, it is seen that the speed of the vehicle V is maintained between 30 and 32 m.p.h. as long as the vehicle V receives a 270 code rate.

Referring now to FIG. 1, when the vehicle V enters track section 3T, the coding of track section 4T is terminated by the opening of front contact 84 of track relay 3TR, and a 270 code rate is now applied to the left-hand end of track section 3T by a circuit extending from (BX), through the front contact 155 of direction registration relay DIR, back contact 156 of relay 3TR, front contact 157 of code transmitter 270CT, front contact 158 of relay 2TR, through the rails of section 3T and the train shunt, and to (NX). The vehicle V may now continue over track section 3T at the preselected safe running speed of 30–32 m.p.h. Referring to FIG. 2A, a front contact 159 of slow releasing relay W–270RP is connected in multiple with front contact 96 of relay W–270R, to prevent drop away of relay W–LES, of FIG. 2B, if the 270 code rate is momentarily lost when passing the insulated joints between track sections 3T and 4T.

As mentioned previously, as the westbound vehicle V approaches track section 2T, a wayside speed check is performed by speed determining apparatus W–SD. Assuming that the vehicle carried speed governing apparatus is functioning properly, trip stop W–TS will then be operated to its "clear" position by speed determining apparatus W–SD. This wayside speed check will stop the vehicle V during an over speed condition, if for some reason the vehicle carried speed governing apparatus fails to properly maintain the speed of vehicle V within the predetermined speed limits called for by the 270 code rate now being applied to track section 3T.

When the vehicle V enters track section 2T, a 180 code rate is applied to the left-hand end of track section 2T by a circuit extending from (BX), through front contact 160 of direction registration relay DIR, back contact 161 of relay 2TR, front contact 162 of code transmitter 180CT and through front contact 163 of track relay 1TR. At the same time, the 270 code rate is removed from section 3T.

Relay W–180R, of FIG. 2A, will now be energized while relay W–270R will be dropped away. The DYNAMIC BRAKING traction motor control wire, in FIG. 2D and extending to the vehicle traction motors of FIG. 2E, is thus energized to provide dynamic braking on the vehicle V, by a circuit extending through front contact 164 of relay W–180R, along wire 165 between FIGS. 2C and 2D, and through front contact 166 of relay W–LESP. This dynamic braking of the vehicle traction motors is provided to cause rapid deceleration of the vehicle V in preparation to stopping the vehicle V at station WS. It will furthermore be noted in FIG. 2C that with relay W–180R picked up the SERIES and PARALLEL traction motor control wires, in FIG. 2D, can no longer be energized to provide high speed operation of the vehicle V.

Since the speed of vehicle V, upon entering track section 2T, is somewhere near 30 m.p.h., relays W–SG and W–SGP will obviously be steadily picked up, while relays W–SGPCP and W–SGPCPCP will be released. Therefore, the 16 m.p.h. speed filter is now connected to the output of amplifier W–A1 through front contact 167 of relay W–180R, back contact 168 of relay W–SGPCP and front contact 169 of relay W–FPA. Brake release relay W–BRR, of FIG. 2D, is deenergized at this time, to open its front contact 139 in the previously described energizing circuit to the service brake magnet valve SBMV of FIG. 2E, for applying the vehicle air brakes.

Referring now to FIG. 2C, since relay W–270RP does not immediately drop away when the vehicle V enters section 2T, the picking up of relay W–180R (opening its back contact 136) insures that a certain minimum service brake application will be provided, even though brake release relay W–BRR may subsequently be energized. That is, until relay W–270RP drops away, to close its back contact 170, the service brake magnet valve SBMV cannot be energized. To make sure that the vehicle V receives this service brake application, front contact 24 of relay W–BAR (see FIG. 2D) is inserted in a previously discussed stick circuit of relay W–FSCH, and therefore, if a service brake application is not registered, upon entry into the 180 code territory, an emergency brake application will be initiated.

Assuming now that relay W–270RP has dropped away and that the brake release relay W–BRR is still deenergized, relay W–FPA is stuck in its picked up position by a circuit extending from (A+) in FIG. 2C, along wire 112 between FIGS. 2C and 2D, front contact 113 of relay W–LESP, back contact 114 of relay W–BRR, along wire 115 between FIGS. 2D and 2C, front contact 116 of relay W–FPA, and to (−). As soon as the vehicle speed is reduced below 16 m.p.h., due to the combined effects of the dynamic and air braking, relay W–SG and W–SGP return to their normal coding condition. Such coding of relays W–SG and W–SGP then cause pick up of relay W–SGPCP and the 5 m.p.h. filter is then connected to amplifier W–A1 through front contact 171 of relay W–SGPCP. At this time, brake release relay W–BRR is picked up to energize wire R, of FIG. 2D, for releasing the air braking on the vehicle V. Referring to FIG. 2D, it will be noted that the energization of wire R, in the 180 code territory, is acocmplished via front contact 135 of relay W–BOR (FIG. 2B) which was energized as the brakes were applied. However, the dynamic braking remains in effect as long as the west end WE of vehicle V occupies track section 2T.

Assuming now that the speed of the vehicle V is between 5 and 16 m.p.h., relays W–SG and W–SGP are steadily picked up by the output of frequency generator W–ADFG, to drop away relay W–SGPCP, thus connecting the 16 m.p.h. speed filter to amplifier W–A1. Relays W–SG and W–SGP then begin their normal coding operation, and, referring to FIG. 2A, it will be noted that relay W–SGPCP now assumes a coded condition while the speed of the vehicle V is between 5 and 16 m.p.h., in the same manner as was previously discussed while the vehicle speed was between 30 and 32 m.p.h., in the 270 code territory. As was pointed out above, relay W–FPA is made slow releasing so that it now bridges the time interval between the picking up of relay W–BRR, just described, and the subsequent picking up of relay W–SGPCPCP in response to the coding condition now assumed by relay W–SGPCP, the alternate stick circuit for relay W–FPA extending from (A+), in FIG. 2C, along wire 112 between FIGS. 2C and 2D, through front contact 113 of relay W–LESP, along wire 172 between FIGS. 2D and 2C, through front contact 173 of relay W–SGPCPCP, front contact 116 of relay W–FPA, and to (−).

As the speed of the vehicle V decreases, due to the dynamic braking effect, a point will be reached where the vehicle speed decreases below 5 m.p.h. When this occurs, relays W–SG and W–SGP return to their normal coding condition, wherein relay W–SGPCP is maintained steadily energized and relay W–SGPCPCP is deenergized. As soon as relay W–SGPCPCP drops away no stick circuit then exists for relay W–FPA and subsequently this relay drops away. Referring now to FIG. 2A, it will be noted that the output of amplifier W–A1 is now applied to either the 5 or 7 m.p.h. speed filters, in accordance with the condition of relay W–SGPCP.

Since it is assumed that the present speed of vehicle V has decreased below 5 m.p.h. and that relay W–SGPCP is subsequently picked up, the SWITCHING traction motor control wire of FIG. 2D, having associated with it a so-called "balance speed" of approximately 7 m.p.h., is energized to slightly increase the speed of the vehicle V by a circuit including wire 142 in FIG. 2C, back contact 143 of relay W–SGPCPCP, front contact 174 of relay W–180R, back contact 175 of relay W–270RP and wire 146 between FIGS. 2C and 2D. However, as soon as this minimum power to the vehicle traction motor increases the speed of vehicle V above 5 m.p.h., relays W–SG and W–SGP are steadily energized to drop relay W–SGPCP. This in turn picks up relay W–SGPCPCP and removes the energization to the SWITCHING wire of FIG. 2D, by the opening of back contact 143 of relay W–SGPCPCP. It will be noted in FIG. 2A the deenergization of relay W–SGPCP connects the 7 m.p.h. speed filter to amplifier W–A1, through back contact 168 of relay W–SGPCP and back contact 176 of relay W–FPA. Assuming that the vehicle speed lies somewhere between 5 and 7 m.p.h., relays W–SG and W–SGP alternating assume coding and steadily energized operations, and in a manner similar to that previously described for vehicle speed of 30–42 m.p.h. and 5–16 m.p.h., relay W–SGPCP begins to code, to steadily energize relay W–SGPCPCP for preventing the energization of the SWITCHING wire of FIG. 2D. If at this time the speed of vehicle V should increase above 7 m.p.h., due to track grade, etc., relay W–SGPCP will be steadily deenergized, as will be relay W–SGPCPCP, to drop the brake release relay W–BRR, to initiate a service brake application.

When the vehicle V advances onto track section 1T, of FIG. 1, the "no code" condition is detected by receiver coils W–RC and relays W–SG, W–SGP, W–SGPCP and W–SGPCPCP are now all dropped away. Thus, all of the previously described energizing circuits for brake release W–BRR are now opened to provide a full service brake application on the vehicle V, and it is assumed here that this service brake application will be sufficient to properly stop the vehicle V in the desired position, wherein receiver coils W–RC are adjacent loop circuit 1L and receiver coils E–RC are adjacent loop circuit 2L.

It will be noted in FIGS. 2A and 2B that, when the vehicle V enters the "no code" territory of track section 1T, the relay W–LES is dropped away by the interruption of its present stick circuit, at front contact 177 of relay W–180R. This dropping away of relay W–LES is effective through its back contact 29, of FIG. 2B, to maintain relay W–NOR in an energized position, preventing an emergency brake application, even though the motion detector relay W–MD, of FIG. 2A, is subsequently dropped away when the vehicle speed is reduced below that value necessary to maintain relay W–MD picked up. As mentioned previously, the speed at which relay W–MD drops away as dependent upon the characteristics of filter W–MF, set in accordance with the requirements of practice. Referring now to FIG. 2D, the opening of front contact 107a of relay W–LES, is also effective to turn off the westbound destination sign of FIG. 2E.

AUTOMATIC DIRECTION REGISTRATION

Referring now to FIG. 1, when the vehicle V enters track section 2T so as to drop track relay 2TR, relay W–BT is energized by a circuit extending from (+), through back contact 178 of relay 2TR, front contact 179 of relay 1TR, and to (−). When the vehicle V subsequently enters track section 1T, so as to drop track relay 1TR, the energizing circuit for relay W–BT is then interrupted. However, relay W–BT is made slow releasing to prevent application of the 120 code rate to loop circuits 1L and 2L until the vehicle V has had sufficient time within which to come to a complete stop.

Assuming now that relay W–BT has dropped away, the energizing circuits to motor driven timer W–TE and relay W–120A are simultaneously completed. The timing operation of timer W–TE is thus initiated and relay W–120A is picked up through back contacts 180, 181 and 182 of relays 1TR, W–BT and W–TEP respectively, and thereby opens its back contact 183 to prevent operation of direction registration relay DIR. At the same time 120 code rate is applied to loop circuits 1L and 2L by a circuit extending from (BX), through front contact 184 of direction registration relay DIR, back contact 185 of relay 2TR, front contact 186 of code transmitter 120CT, back contact 187 of relay W–BT, through loop circuits 1L and 2L, and to (NX). Both ends of the vehicle V now simultaneously receive a 120 code through the medium of their respective receiving coils W–RC and E–RC, and therefore, relays W–120R and E–120R, of FIGS. 2B and 2F respectively, are simultaneously picked up.

Relay W–TR, of FIG. 2B, is now energized by a circuit extending from (A+), through back contact 188 of relay W–LES, front contact 189 of relay W–LESP, front contact 190 of relay W–120R, and to (−). This relay W–TR is then stuck through its own front contact 191 and back contact 192 of relay W–TRS. At the same time, door unlock wire DU, of FIGS. 2D and 2E, is energized from (A+), through front contact 66 of relay W–120R and through back contacts 67 and 193 of relays W–TRS and W–LE respectively. Although the vehicle's doors are not as yet opened, until proper control is received from vehicle end EE, switch DCS, of FIG. 2E, closes its back contact 194 and drops relay S.

Relay E–TRS, of FIG. 2F, is slow releasing and does not immediately drop away after the opening of back contact 80 of relay E–120R (see FIG. 2H) and therefore relay E–LE, of FIG. 2F, can now be energized by a circuit extending from (A+), in FIG. 2E, through the back contact 194 of switch DCS, along wire 195 between FIGS. 2E, 2H and 2F, front contact 196 of the slow releasing relay E–TRS, front contact 197 of relay E–120R, back contact 198 of relay E–LESP, and to (−). When relay E-TRS drops away, relay E-LE then sticks on a circuit including its own front contact 199, back contact 200 of relay E-LES, back contact 201 of relay E-TRS, front contact 54 of pressure switch E-BPPS, and to (C+). At this time, the eastbound destination sign, of FIG. 2E, is illuminated by a circuit extending from (C+) in FIG. 2H, through front contact 202 of relay E-LE, along wire 203 between FIGS. 2H and 2E, and to (−).

With relay E-LE picked up and relay E-TR dropped away, the door open wire DO, of FIGS. 2H and 2E, is now energized by a circuit extending from (C+) in FIG. 2H, through front contact 63 of relay E-120R, back contact 64 of relay T-TRS and through front contact 204 of relay E-LE. The doors of the vehicle V are now opened to permit exit of the passengers at station WS, and subsequently, relay DOR, of FIG. 2E, is energized through the front contact 70 of switch DOS to indicate that the vehicle doors properly opened during the station stop at station WS. Furthermore, relay DOR is stuck in this picked up position through the already described stick circuit including back contact 71 of relay S and front contact 72 of relay DOR.

Returning now to FIG. 1 and the wayside apparatus, after the timing interval for timer W-TE has elapsed, relay W-TEP is picked up, through front contact 204a of timer W-TE, to interrupt the energizing circuit for relay W-120A. After another time interval, determined by the slow release time for relay W-120A, relay W-120A will drop away and it will be noted in FIG. 1 that it is only after such drop away of relay W-120A that direction registration relay DIR can be energized to close its lower or eastbound traffic contacts.

Assuming now that programmer PR, in response to the condition of time TM and the time schedule for vehicle V, operates programmer switch PS to close its right-hand or eastbound contact 205, direction registration relay DIR is now actuated to its eastbound traffic position; i.e. it is illustrated back contacts are made, by a circuit extending from (+), through back contact 183 of relay W-120A, front contact 206 of relay W-TEP, eastbound contact 205 of programmer switch PS, and to (−). At this same time, front contact 184 of direction registration relay DIR is opened to remove the 120 code rate from loop circuits 1L and 2L.

Referring now to FIG. 2B, relay W-TRS is now picked up by a circuit extending from (A+) in FIG. 2B, through back contact 188 of relay W-LES, front contact 189 of relay W-LESP, front contact 207 of relay W-TR, along wire 208 between FIGS. 2B, 2D and 2C, back contact 209 of relay W-270R, along wire 210 between FIGS. 2C and 2D, back contact 211 of relay W-120R, along wire 212 between FIGS. 2D and 2B, and to (−). At this time, relay W-TR is dropped away, due to the opening of back contact 192 of relay W-TRS, and furthermore, relay W-LESP is also dropped away by the opening of back contact 107 of relay W-TRS. Relay W-TRS is then stuck through its own front contact 213 of FIG. 2D.

Referring now to FIGS. 2D and 2H, as soon as the 120 code rate is removed from loop circuits 1L and 2L, the door open wire DO, of FIG. 2H, and the door unlock wire DU, of FIG. 2D, are deenergized, so that the vehicle doors are now closed and locked. As soon as switch DCS closes its front contact 69, relay S, of FIG. 2E, is energized through contact 69 of relay DCS, front contact 86a of relay DOR, and to (−). Relay S is subsequently retained in an energized position by the obvious stick circuit including its own front contact 87. Furthermore, this picking up of relay S is effective to drop the relay DOR so that wire 89, in FIGS. 2E and 2H, is connected to wire 92, in FIGS. 2E and 2D.

With a 270 code rate now being applied to the right-hand end of track section 2T by a circuit extending from (BX), in FIG. 1, through back contact 214 of relay DIR, front contact 215 of track relay 3TR, front contact 216 of code transmitter 270CT, back contact 217 of relay 2TR, the top rail of track section 2T, the train shunt provided by the vehicle V and to (NX) via the lower rail of track section 2T, relay E-LES, of FIG. 2F, can now be picked up. Starting on FIG. 2B, this pick up circuit for relay E-LES extends from (A+) in FIG. 2B, through front contact 218 of relay W-TRS, along wire 92 between FIGS. 2B, 2D and 2E, through back contact 91 of relay DOR, front contact 90 of relay S, along wire 89 between FIGS. 2E, 2H to 2F, front contact 219 of relay E-LE, along wire 220 between FIGS. 2F and 2G, through front contacts 221 and 222 and of relay E-270R, along wire 223 between FIGS. 2G and 2F, through contacts 224, 225 and 226 of push buttons E-MAPB, E-LEPB and E-TRPB respectively, back contacts 227 and 228 of relays E-TR and E-TRS respectively, and to (−). Relay E-LES is then stuck through its own front contact 229 and along wire 230 between FIGS. 2F and 2G.

As soon as relay E-LES picks up, as just described, the existing stick circuit for relay E-LE, of FIG. 2F, is interrupted by the opening of back contact 200 of relay E-LES and furthermore, relay E-LESP is now picked up by the obvious pick up circuit including front contact 231 of relay E-LES and front contact 54 of pressure switch E-BPPS. The direction registration is now completed for the desired eastbound move of the passenger vehicle V, from station WS to station ES. Referring to FIG. 2H, the closing of front contact 232 of relay E-LES furthermore keeps the eastbound destination sign illuminated.

Referring now to FIG. 2G of the accompanying drawings, the speed governing circuits associated with vehicle end EE are substantially the same as the corresponding circuits on vehicle end WE and therefore, the speed control of the vehicle V, as it operates toward terminal station ES, of FIG. 1, will not be described in detail. However, it is considered desirable to discuss the energization of the SWITCHING, SERIES and PARALLEL traction motor control wires, of FIG. 2H, which control the operation of the vehicle traction motors, of FIG. 2E, for this eastbound move. Thus, in response to 270 code rate being received by a receiver coil E-RC, of FIG. 2G, relay E-270RP is energized by a circuit extending from (C+) in FIG. 2F, through front contact 233 of relay E-LES, along wire 234 between FIGS. 2F and 2G, through front contact 235 of relay E-270R, and to (−). This picking up of relay E-270RP completes the obvious pick up circuit for relay E-FPA, of FIG. 2J, and furthermore connects the 32 m.p.h. speed filter, of FIG. 2G, to the output of amplifier E-A1. In exactly the same manner as was previously discussed when considering the operation of the speed governing circuits of FIG. 2A, relays E-SG and E-SGP begin to code and cause relay E-SGPCP to be steadily picked up and relay E-SGPCPCP to be dropped away. Brake release relay E-BRR, of FIG. 2H is now energized by circuit extending from (C+), in FIG. 2F, through front contact 236 of relay E-LES, along wire 237 between FIGS. 2F, 2H and 2J, through front contact 238 of relay E-SGPCP, along wire 239 between FIGS. 2J and 2H, and to (−). The air pressure in the brake cylinders of vehicle V is now drained off by the energization of wire R, of FIG. 2H, by a circuit extending from (C+) in FIG. 2H, through front contact 240 of relay E-LES, front contact 241 of relay E-BRR, and either through front contact 242 of relay E-BOR or along wire 243 between FIGS. 2H and 2J, through front contact 244 of relay E-270R and along wire 245 between FIGS. 2J and 2H. Referring now to FIG. 2E, the service brake magnet valve SBMV and emergency brake magnet valve EBMV are controlled in accordance with the selective energization of wires 11 and 13 respectively, of FIGS. 2H and 2E, in substantially the same manner as was previously discussed during westbound movement of the vehicle V.

With relays E-BAR and E-BOR, of FIG. 2F, now deenergized, indicating that the air pressure has been sufficiently reduced to release the vehicle air brakes, the SWITCHING wire, of FIGS. 2H and 2E, is now energized to cause the vehicle traction motors to rotate in that direction necessary to drive the vehicle V in the desired eastbound direction, by a circuit extending from (C+) in FIG. 2F, through front contact 236 of relay E–LES, along wire 237 between FIGS. 2F, 2H and 2J, front contact 238 of relay E–SGPCP, along wire 239 between FIGS. 2J and 2H, back contact 246 of relay E–BOR, along wire 247 between FIGS. 2H and 2J, back contact 248 of relay E–SGPCPCP, back contact 249 of relay E–180R, front contact 250 of relay E–270RP, along wire 251 between FIGS. 2J and 2H, and through back contact 252 of relay E–BAR. The 270 code rate now being received by receiver coils E–RC, of FIG. 2G, is also effective, through front contact 253 of relay E–FPA and along wire 254, between FIGS. 2J and 2H, to simultaneously energize the SERIES and PARALLEL traction motor control wires, which extend between FIGS. 2H and 2E, for progressively increasing the speed of the vehicle V in the desired eastbound direction.

In substantially the same manner as previously discussed for the westbound vehicle move, the vehicle V is now automatically controlled to run at between 30 and 32 m.p.h. on track sections 2T and 3T, of FIG. 1, and furthermore, when the vehicle V arrives at track section 4T, it will receive a 180 code rate preparing the vehicle V for its stop at terminal station ES wherein it will come to rest with receiver coils W–RC and E–RC adjacent loop circuits 4L and 5L respectively. As mentioned previously, the dotted representation of the vehicle V, shown in FIG. 1, illustrates the position of the vehicle while at station ES. Furthermore, in substantially the same manner as was previously discussed when considering the westbound movement of vehicle V toward station WS, a wayside speed check is provided, on the approach to track section 4T, by speed determining apparatus E–SD to stop the vehicle V, through the medium of the trip stop E–TS, if the vehicle carried speed governing apparatus fails to maintain the speed of vehicle V within the predetermined speed limits called for by the 270 code rate now being applied to the right-hand end of track section 3T.

Referring now to FIG. 1, when the vehicle enters at the left-hand end of track section 4T, relay E–BT is picked up by a circuit extending from (+), through back contact 37 of track relay 4TR, front contact 255 of track relay 5TR, and to (–). This picking up of relay E–BT delays the application of the 120 code rate to loop circuits 4L and 5L, until the vehicle V has had sufficient time within which to come to a complete stop at station ES. However, when this slow releasing relay E–BT finally drops away, a 120 code rate is applied to loop circuits 4L and 5L over a previously described circuit including back contact 33 of direction registration relay DIR, back contact 34 of track relay 4TR, front contact 35 of code transmitter 120CT and back contact 36 of relay E–BT. As mentioned previously, this 120 code rate, to loop circuits 4L and 5L, operates to open the doors of vehicle V and furthermore, causes the westbound destination sign, of FIG. 2E, to be illuminated, for displaying the next stop for the vehicle V during its shuttle operation between stations ES and WS.

The vehicle V then remains at station ES, until such time as programmer PR, of FIG. 1, calls for a westbound movement of vehicle V, in accordance with the predetermined time schedule for the vehicle. However, the preselected timing of motor driven timer E–TE and relay E–120A insures that vehicle V will remain at station ES for some predetermined minimum time to permit the safe movement of passengers into and out of passenger vehicle V.

Since it may be desirable, in practice, to be able to place the vehicle V into manual control, for example, when taking the vehicle out of service or because of some malfunctioning of the automation equipment, the vehicle V has been trainlined with a plurality of automatic-to-manual conversion switches AMS (see FIGS. 2B and 2F) which when depressed, momentarily connects the vehicle carried car battery to ground for dropping the manual-to- automatic relays W–MAR and E–MAR, of FIGS. 2B and 2F respectively, thereby turning off the vehicle automation equipment and placing the vehicle under manual control. Since it would be normally advisable to permit such automatic-to-manual conversion, only while the vehicle V is stopped, front contacts 256 and 257 of relays E–BAR and W–BAR respectively (see FIGS. 2B and 2F) are connected in the above described trainlined circuit to check that the vehicle air brakes are fully applied before the vehicle V may be converted from automatic-to-manual operation.

Having thus described a vehicle remote control system as one specified embodiment of the present invention, it is to be understood that this form is selected to facilitate in the disclosure of the invention rather than it limit the number of forms which it may assume, and it is to be further understood that various modifications, adaptations and alterations may be applied to the specific form shown, to meet the requirements of practice, without in any manner departing from the spirit or scope of the present invention.

What I claim is:

1. In a system for controlling a passenger vehicle equipped with doors during the stopping of said vehicle adjacent a wayside station, the combination of, motion detector means responsive to the speed of said vehicle effective to register whether or not said vehicle is in motion, position registering means partly on the wayside and partly on the vehicle responsive to said motion detector means effective to register whether or not said vehicle when stopped is at a predetermined position adjacent said wayside station, and door operating means responsive to the registration of said position registering means effective to open said vehicle doors during the station stop only provided that said vehicle has stopped at said predetermined position.

2. In a system for controlling a passenger vehicle equipped with doors along a right-of-way including at least one station at which said vehicle is to stop, the combination of, direction registration means effective to register the desired direction of travel of said vehicle, speed registration means effective to register the actual and desired speeds of said vehicle along said right-of-way, vehicle operating means responsive to the registrations of said direction and speed registering means effective to operate said vehicle in said desired direction along said right-of-way at substantially said desired speed and to stop said vehicle at said wayside station, door operating means rendered effective when said vehicle stops at said station to successively operate said vehicle doors to their open and closed positions, and detecting means responsive to the position of said vehicle doors to permit said vehicle operating means to start said vehicle in motion subsequent to said station stop provided only that said vehicle doors are in their closed positions.

3. The combination specified in claim 2 wherein said detecting means are furthermore effective to permit said vehicle operating means to start said vehicle in motion subsequent to said station stop provided only that the doors of said vehicle have been opened during said station stop.

4. In a system for controlling a passenger vehicle equipped with doors during operation along a right-of-way including at least one station at which said vehicle is to stop, the combination of:
(a) registration means responsive to the presence of said vehicle at said station for providing a registration indicative that said vehicle has stopped at said station,
(b) said registering means having timing means rendered effective when said vehicle arrives at a predetermined point in approach of said station during its stopping to begin timing out a predetermined time interval, said predetermined stopping time interval being of a duration such as to allow said vehicle to come to a complete stop at said station before the expiration of such stopping time interval.

(c) door opening means responsive to said registering means rendered effective when said registering means is registering that said vehicle has stopped at said station to control said doors on the vehicle to their open positions, (d) door control timing means effective to time out a selected door open time interval, (e) door closing means responsive to said timing means rendered effective at the end of said selected door open time interval to control said doors of the vehicle to their closed positions, and (f) means rendered effective at the completion of the said predetermined stopping time interval to indicate that said vehicle has stopped at said station.

5. In a control system for a railway vehicle equipped with receiving means at each end of the vehicle for respectively receiving control messages communicated to the associated end of said vehicle and wherein said vehicle is controlled to operate along its right of way in accordance with said control messages when received at the controlling end by the then effective receiving means, the combination of:

(a) wayside control message transmitting means for transmitting control messages from the wayside to the then effective receiving means at the controlling end of said vehicle distinctive of the desired performance of said vehicle, (b) means responsive to the location of said vehicle on said right of way rendered effective when said vehicle arrives at a predetermined location along said right of way at which it is desired to render effective the receiver means at the opposite end of said vehicle for causing said wayside code transmitting means to communicate a particular control message to said vehicle, and (c) means on the vehicle rendered effective when said particular control message is received for reversing said receiver means so as to render the receiver means at said opposite end subsequently only effective to receive said control messages when thereafter transmitted from the wayside.

6. In a system for controlling the operation of an automated vehicle equipped with a driving power unit controllable to supply variable driving power for said vehicle and braking apparatus controllable to supply variable braking pressure to said vehicle, the combination of:

(a) registration means for providing a registration of the actual and desired speeds of said vehicle, (b) brake control means responsive to said speed registration means effective to control said braking apparatus to call for a predetermined service application of braking pressure to said vehicle when said actual speed exceeds said desired speed, (c) pressure responsive means connected to said braking apparatus effective to register whether or not said braking apparatus exerts at least a predetermined braking pressure when said service brake application is called for, and (d) means responsive to said pressure responsive means effective to cause an emergency brake application if at least said predetermined amount of braking pressure is not exerted when said service brake application is called for.

7. In a system for controlling a passenger vehicle equipped with doors during operation along a right of way including at least one station at which said vehicle is to stop, the combination of:

(a) registering means responsive to the presence of said vehicle at said station for providing a registration indicative that said vehicle has stopped at said station, (b) door opening means responsive to said registering means rendered effective when said registering means is registering that said vehicle has stopped at said station to control said doors on the vehicle to their open position, (c) door control timing means effective to time out a selected door open time interval, and (d) door closing means responsive to said timing means rendered effective at the end of said selected door open time interval to control said doors of the vehicle to their closed position.

8. The system as specified in claim 7 wherein said door opening means include:

(a) transmitting means on the wayside rendered effective when said registering means is registering that said vehicle has stopped at said station for communicating a door opening control message from the wayside to the vehicle, and (b) door operating means on the vehicle responsive to said door opening control message when received on said vehicle effective to operate said doors to their opened position, and wherein (c) said door control timing means is effective to terminate the transmission of said door opening control message at the end of its selected door open time interval, and (d) said door closing means includes means on the vehicle responsive to the termination of said door opening control message effective to operate said vehicle doors to their closed position.

References Cited

UNITED STATES PATENTS

| | | | |
|---|---|---|---|
| 2,911,077 | 11/1959 | Carter | 192—3 |
| 1,440,416 | 1/1923 | Simmen | 246—163 |
| 1,720,225 | 7/1929 | Lewis | 246—63 |
| 1,735,153 | 11/1929 | Bouton | 187—52 X |
| 1,828,948 | 10/1931 | Rossman | 105—61 |
| 1,907,974 | 5/1933 | Johnston | 246—187 |
| 2,058,523 | 10/1936 | Stearns | 104—149 |
| 2,502,829 | 4/1950 | Cozart | 246—124 X |
| 2,915,623 | 12/1959 | Hughson | 246—182 |
| 1,887,493 | 11/1932 | Miles | 187—52 X |
| 1,947,494 | 2/1934 | Rossman | 105—61 |
| 2,113,207 | 4/1938 | Yingling | 105—61 |
| 2,948,234 | 8/1960 | Hughson | 246—30 X |
| 2,874,272 | 2/1959 | Staples | 246—3 X |
| 2,822,937 | 2/1958 | Fox | 104—151 X |
| 2,770,775 | 11/1956 | Agnew | 246—182.1 X |
| 2,761,962 | 9/1956 | Hughson et al. | 246—194 X |
| 2,557,954 | 6/1951 | Durheim et al. | 246—182 X |
| 2,386,956 | 10/1945 | Klamp | 104—149 |
| 2,348,580 | 5/1944 | Vantassel | 246—76 X |
| 2,961,797 | 11/1960 | Bonanno | 104—151 X |
| 2,628,294 | 2/1953 | Bone | 246—182 X |
| 2,166,194 | 7/1939 | Roman et al. | 104—149 X |
| 3,229,086 | 1/1966 | Allison | 246—187 |
| 2,681,984 | 6/1954 | Van Tassel | 246—63 X |

FOREIGN PATENTS 403,564  12/1933  Great Britain.

ARTHUR L. LA POINT, *Primary Examiner.*

D. F. WORTH, *Assistant Examiner.*

U.S. Cl. X.R.

246—194